April 21, 1936.　　　S. S. JACOBS ET AL　　　2,037,724
FISH CANNING MACHINE
Original Filed May 31, 1930　　25 Sheets-Sheet 1

INVENTORS
Samuel S. Jacobs &
Walter E. Rooney
BY
John C. Carpenter
ATTORNEY

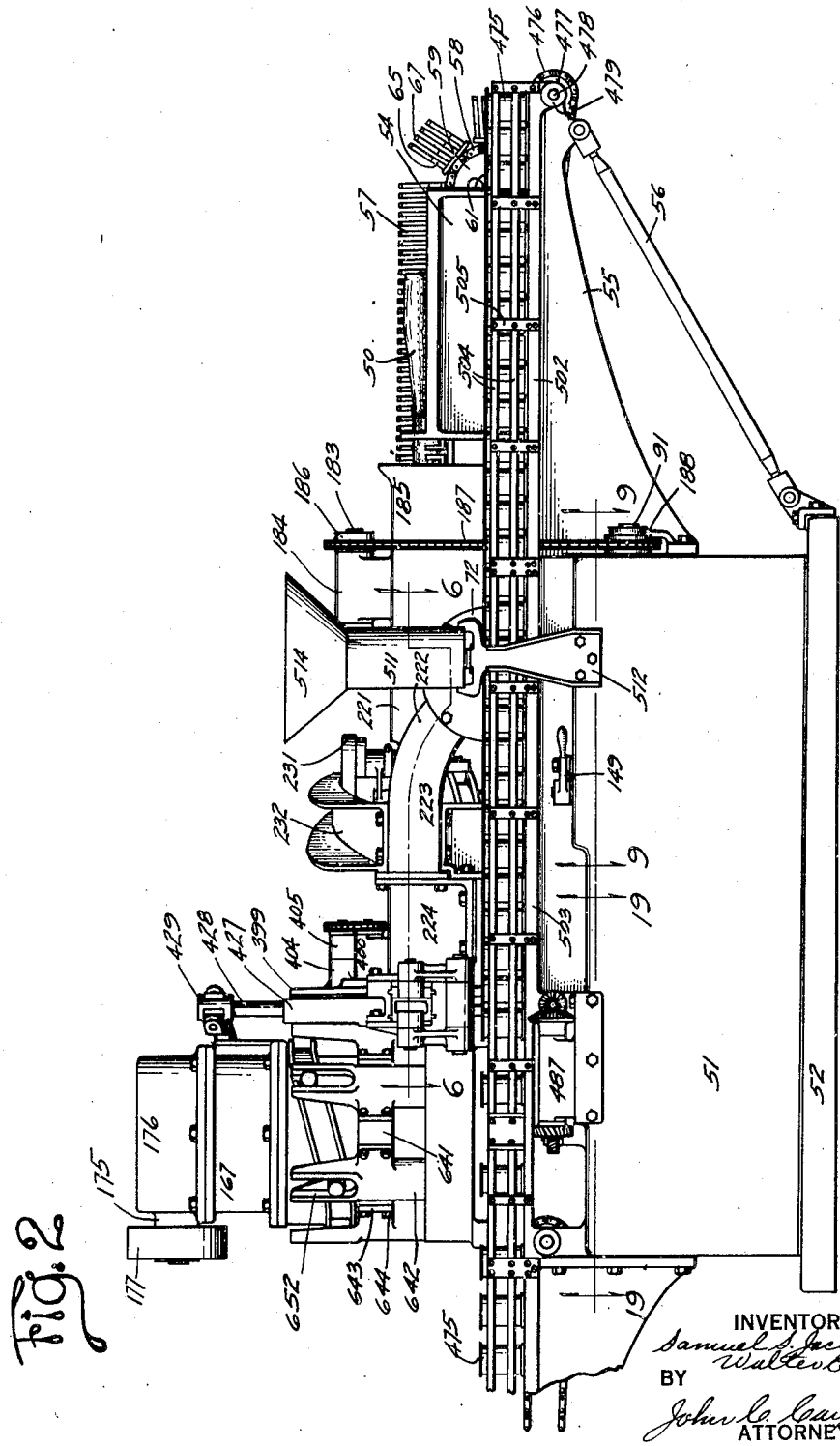

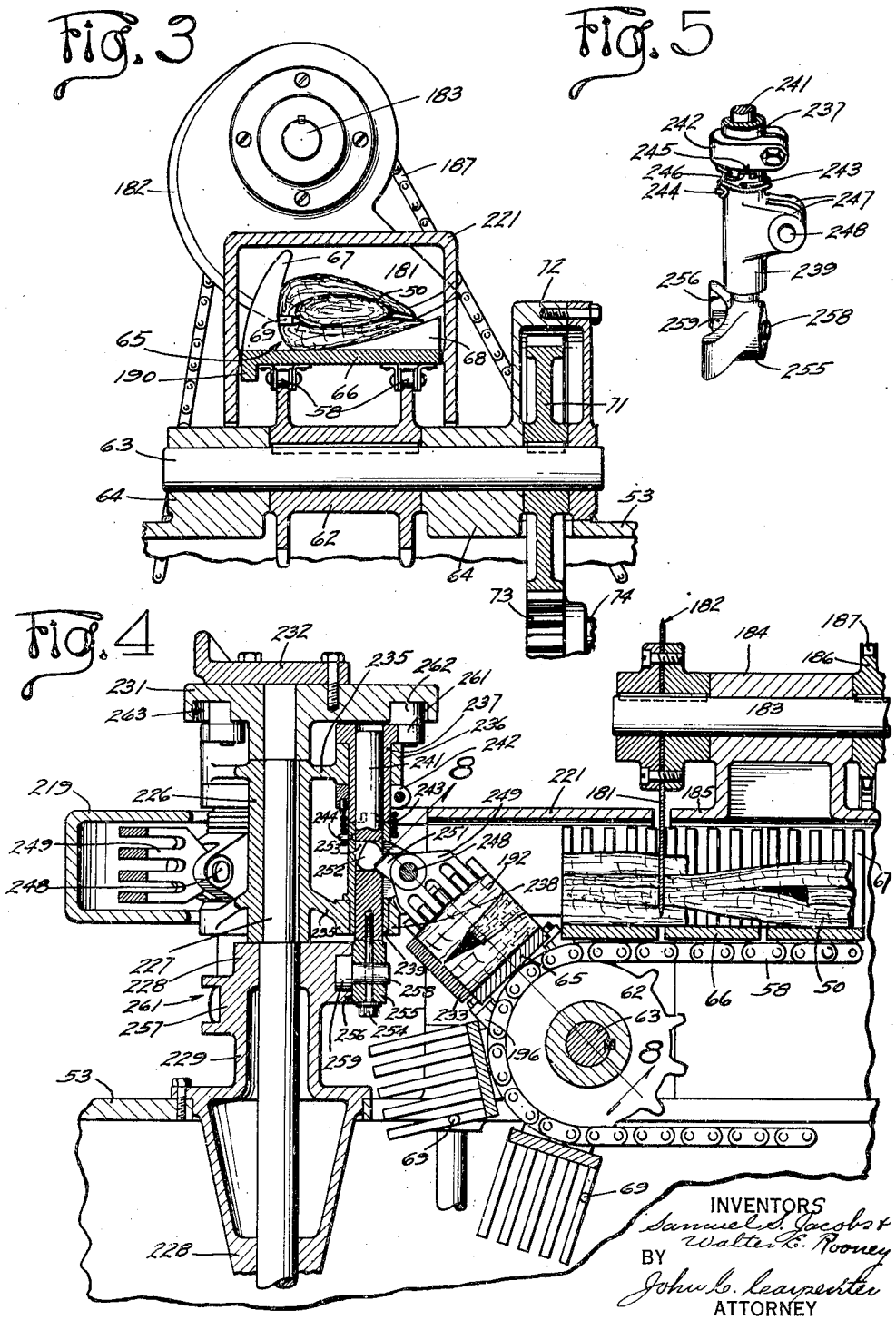

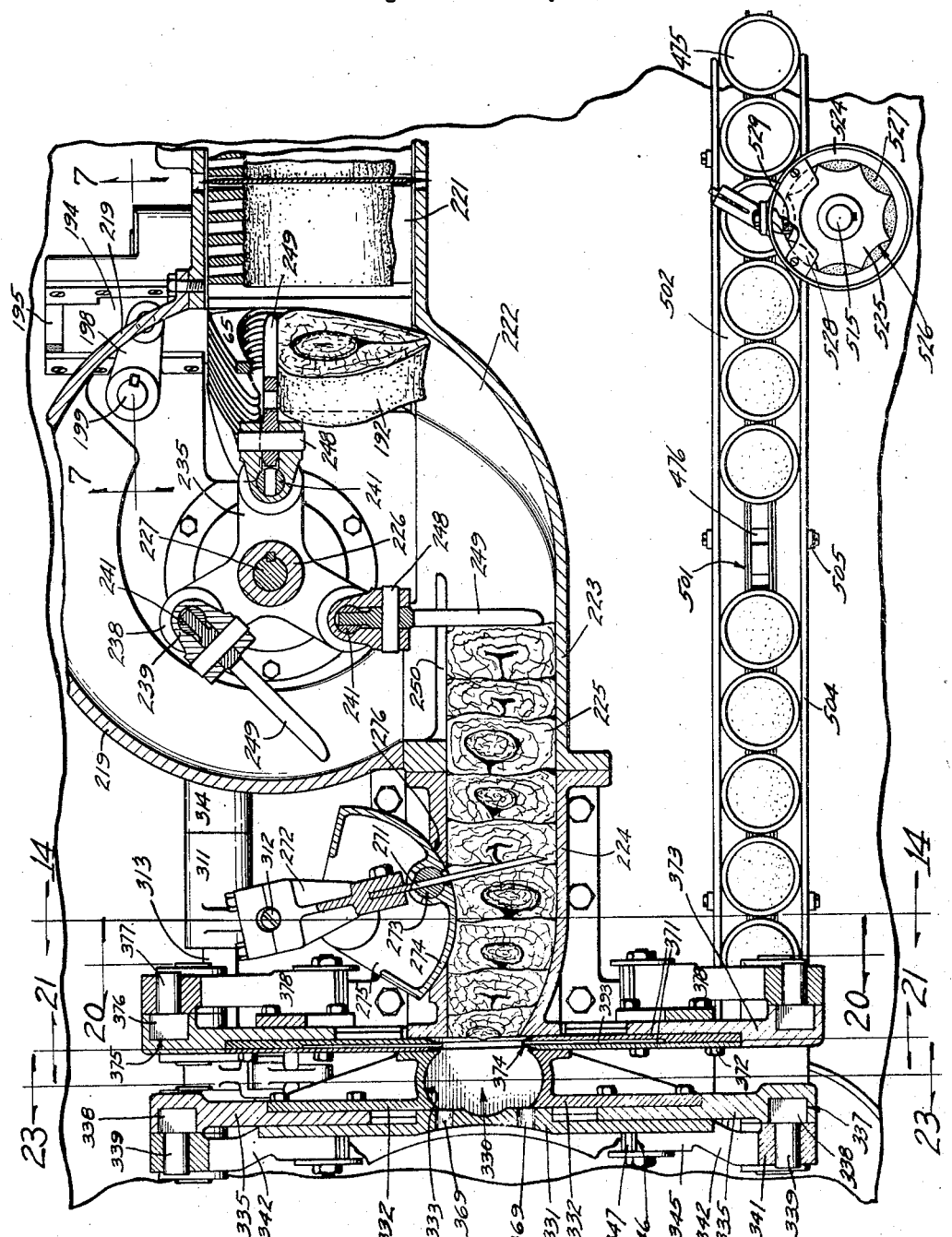

April 21, 1936.  S. S. JACOBS ET AL  2,037,724

FISH CANNING MACHINE

Original Filed May 31, 1930   25 Sheets-Sheet 5

April 21, 1936.  S. S. JACOBS ET AL  2,037,724
FISH CANNING MACHINE
Original Filed May 31, 1930  25 Sheets-Sheet 6

INVENTORS
Samuel S. Jacobs &
BY Walter E. Rooney
John C. Carpenter
ATTORNEY

April 21, 1936.  S. S. JACOBS ET AL  2,037,724
FISH CANNING MACHINE
Original Filed May 31, 1930   25 Sheets-Sheet 7
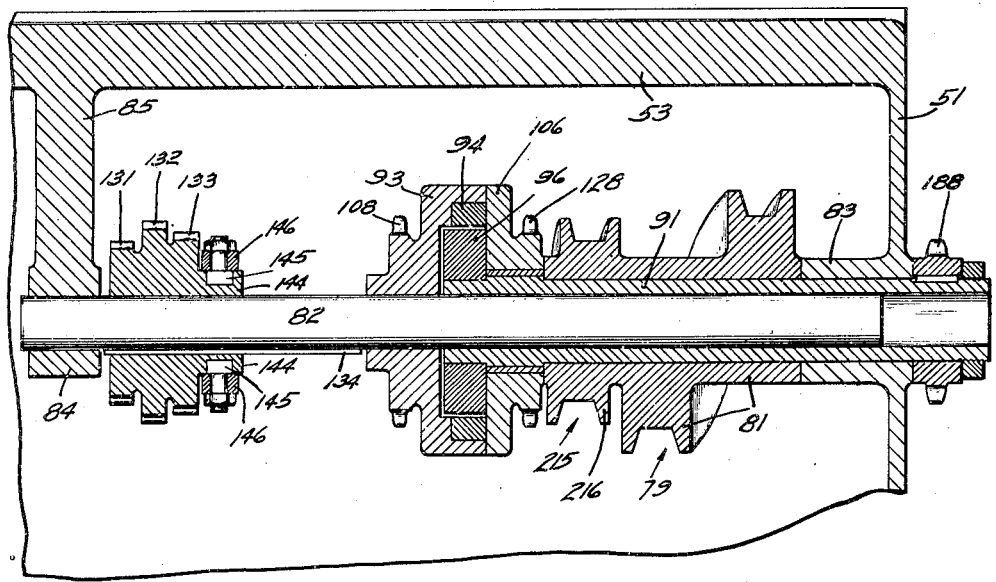
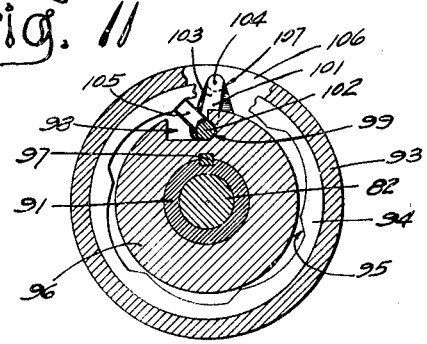
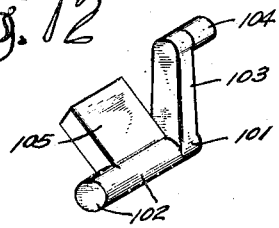
INVENTORS
Samuel S. Jacobs &
BY Walter E. Rooney
John C. Carpenter
ATTORNEY

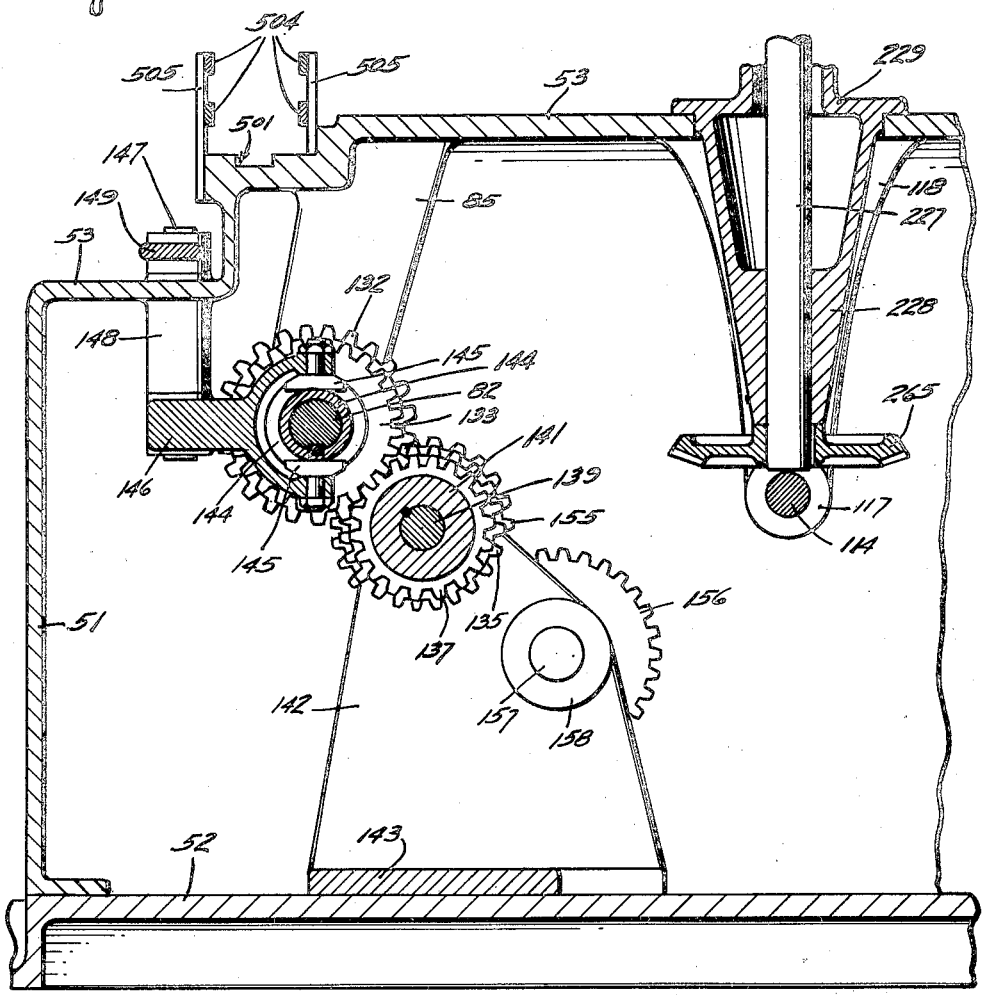

April 21, 1936.     S. S. JACOBS ET AL     2,037,724
FISH CANNING MACHINE
Original Filed May 31, 1930    25 Sheets-Sheet 9
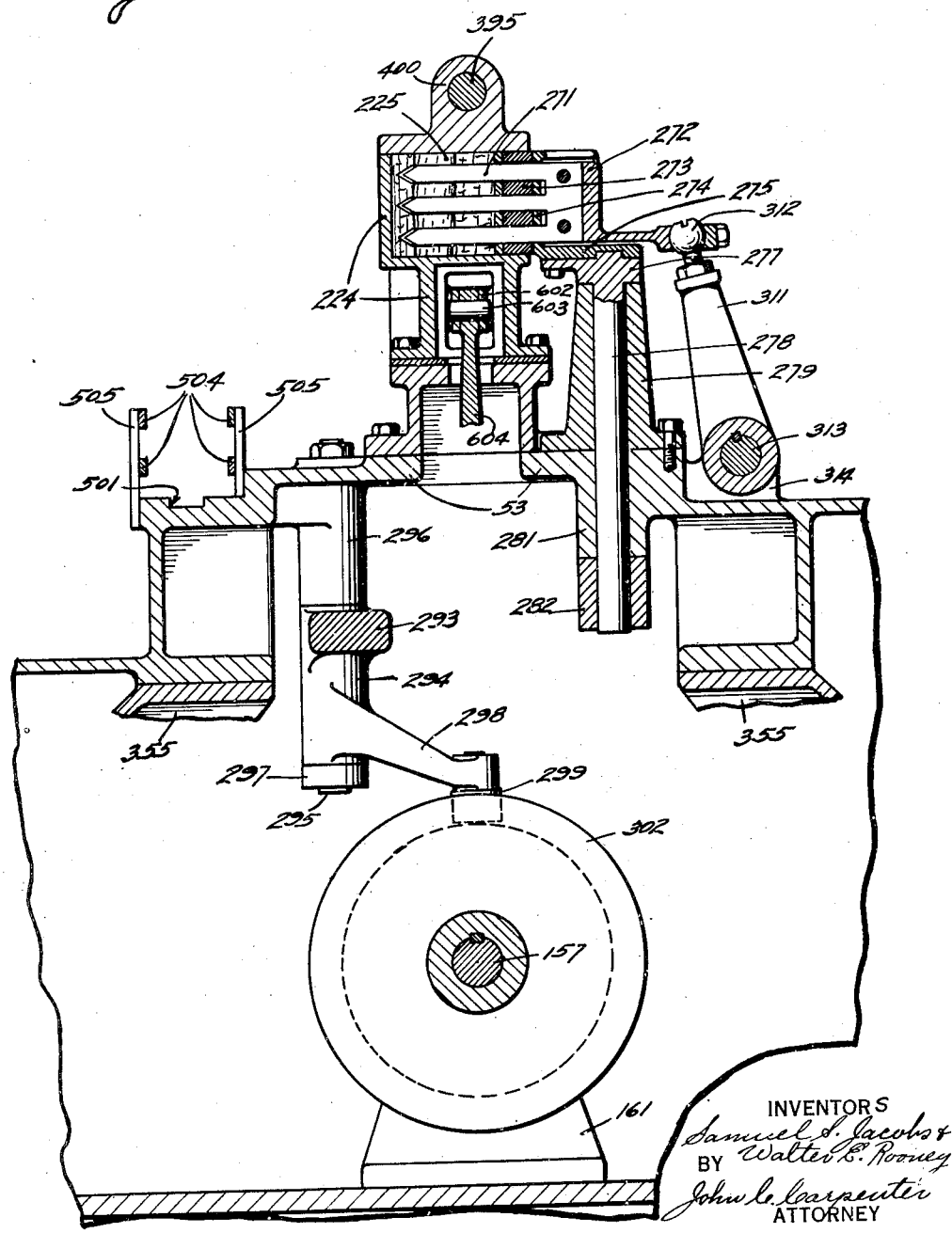

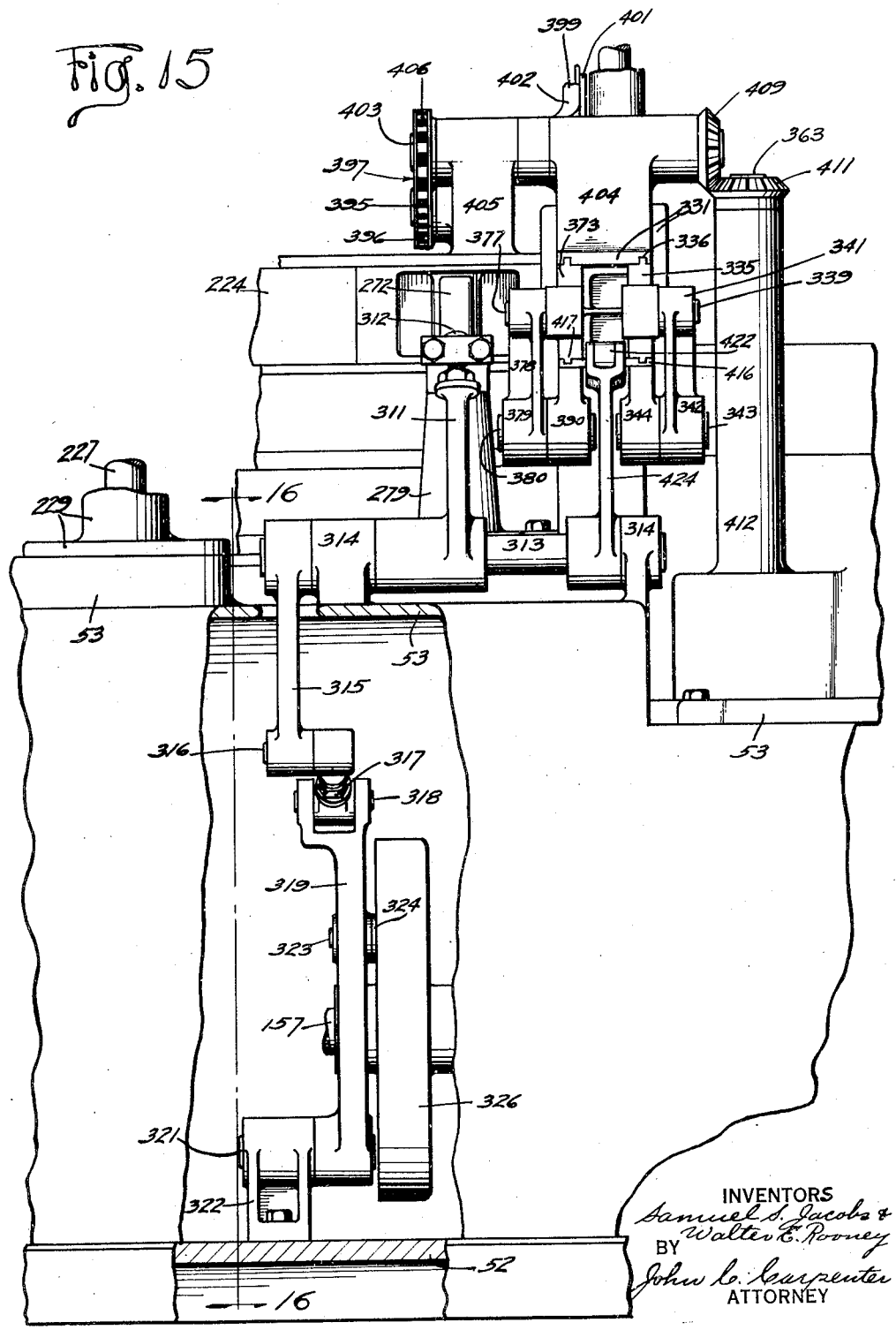

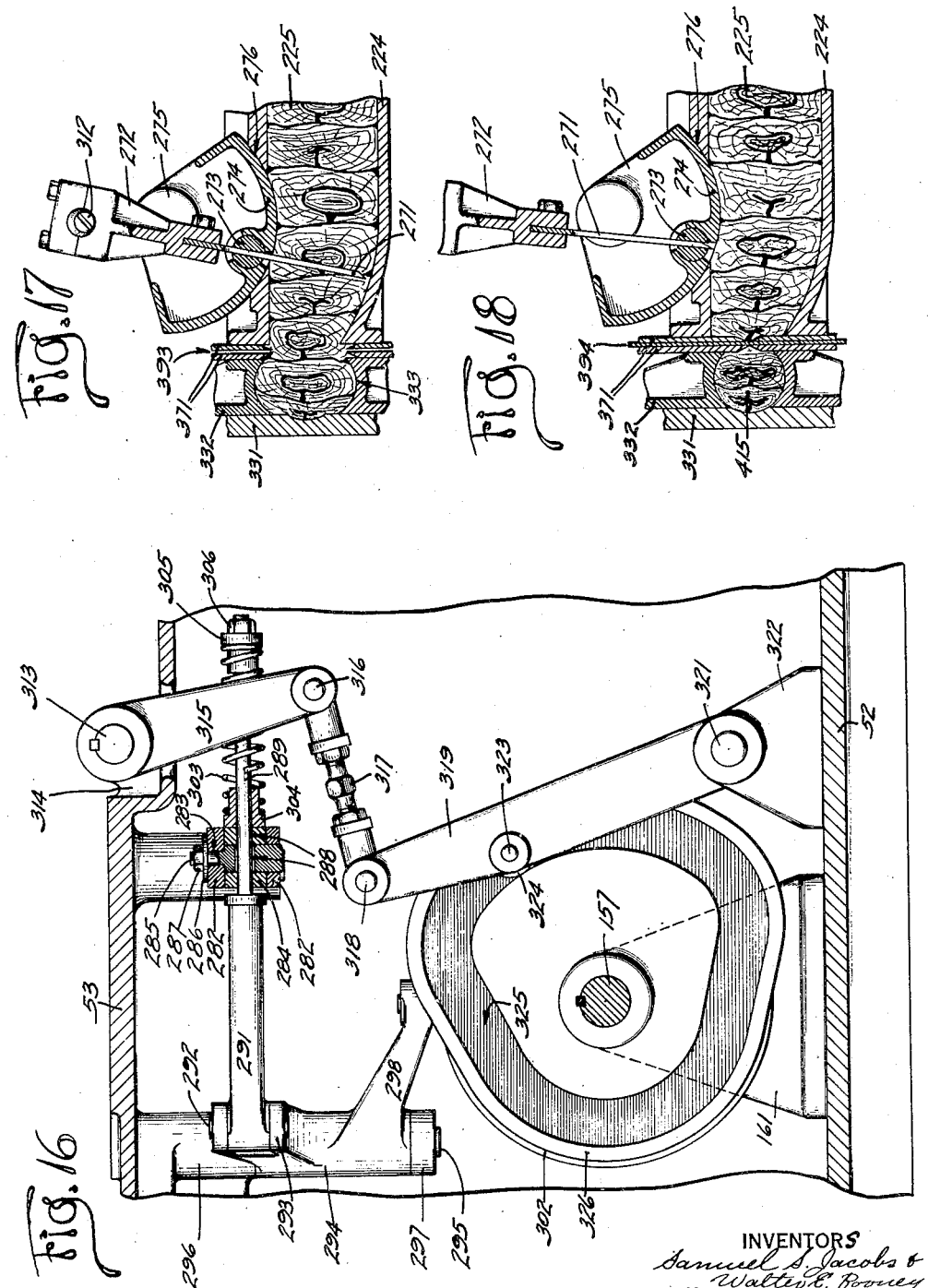
April 21, 1936. S. S. JACOBS ET AL 2,037,724
FISH CANNING MACHINE
Original Filed May 31, 1930 25 Sheets-Sheet 11

April 21, 1936.　　S. S. JACOBS ET AL　　2,037,724
FISH CANNING MACHINE
Original Filed May 31, 1930　　25 Sheets-Sheet 12
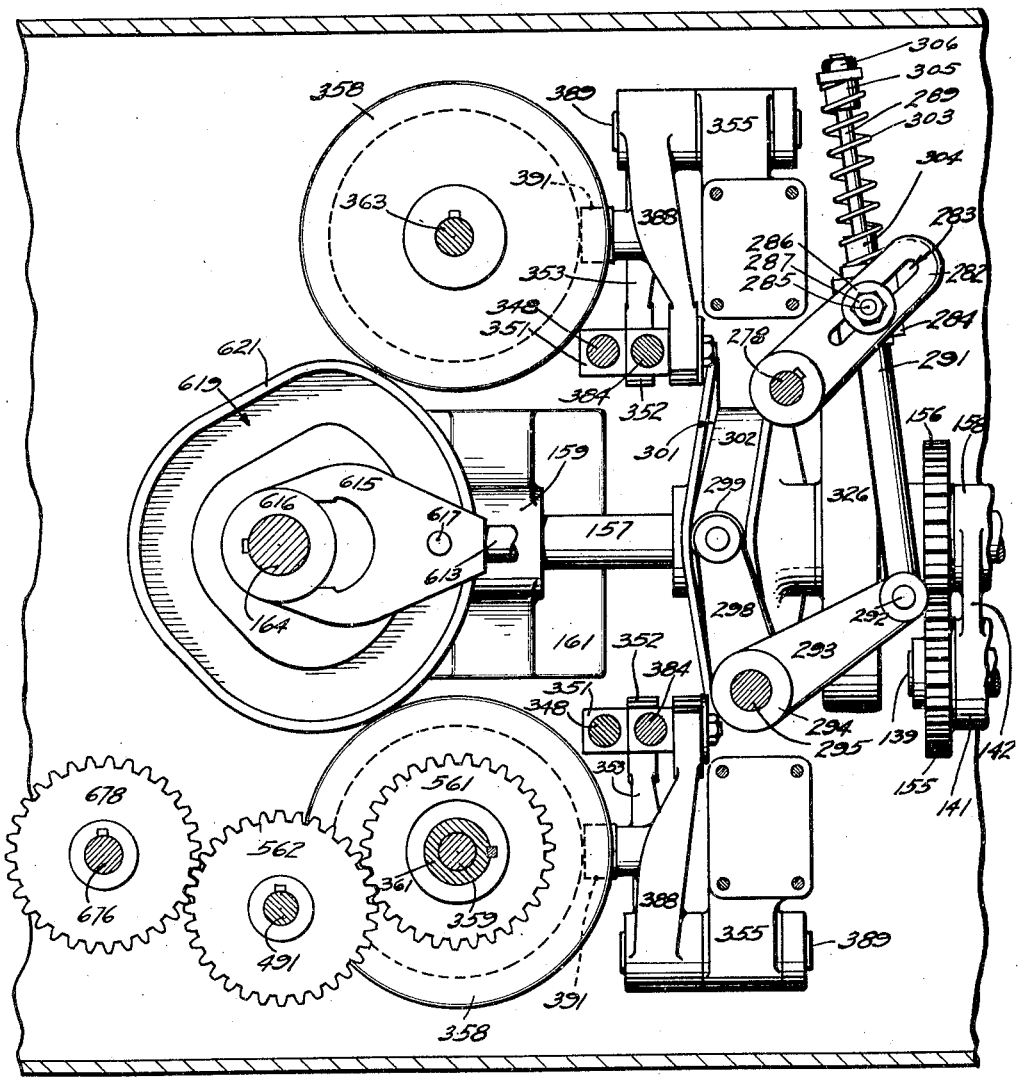

April 21, 1936.  S. S. JACOBS ET AL  2,037,724
FISH CANNING MACHINE
Original Filed May 31, 1930  25 Sheets-Sheet 13

Fig. 20

INVENTORS
Samuel S. Jacobs &
Walter E. Rooney
BY
John C. Carpenter
ATTORNEY

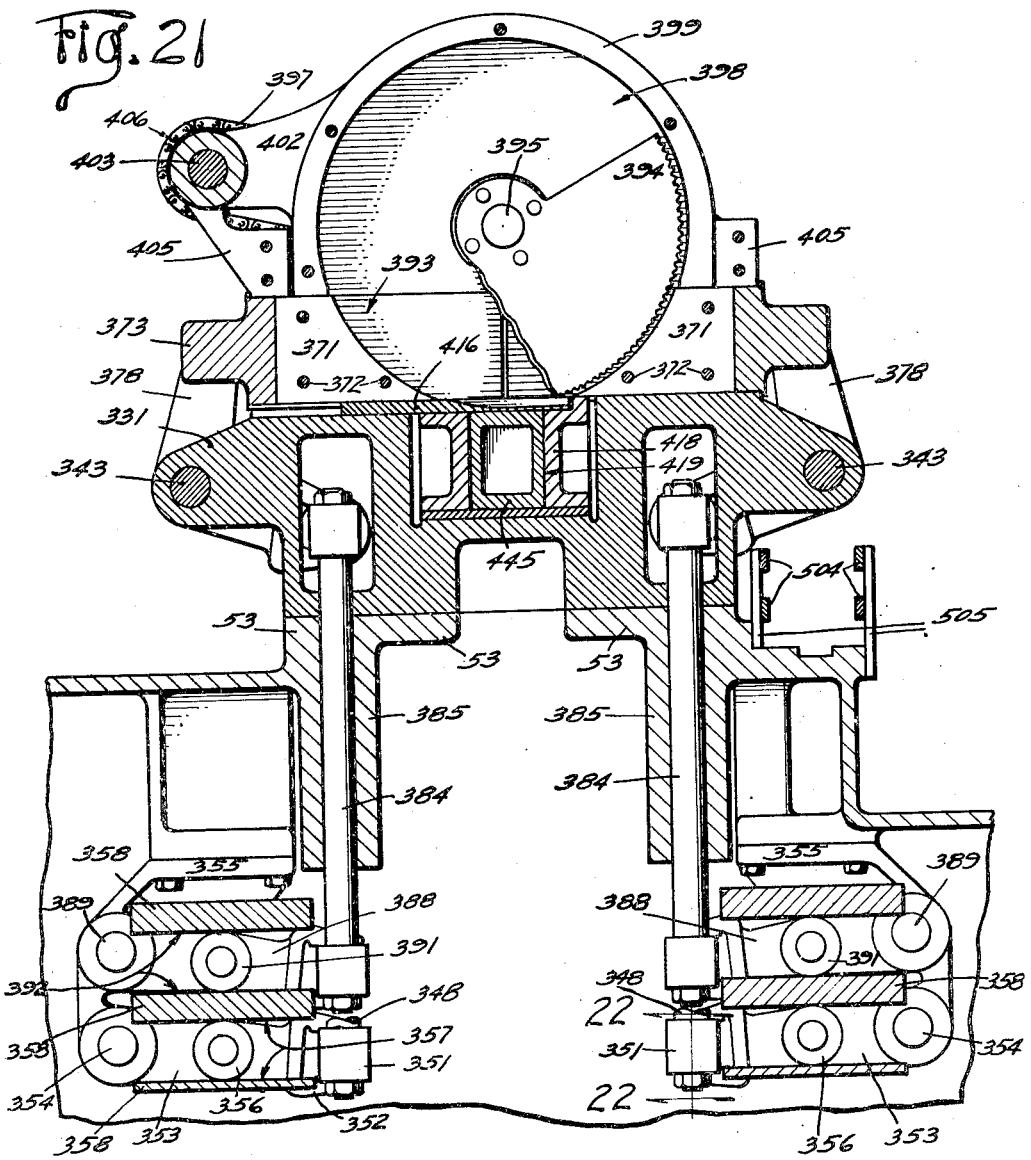
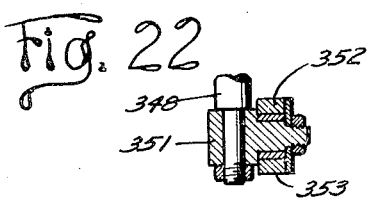

April 21, 1936.    S. S. JACOBS ET AL    2,037,724
FISH CANNING MACHINE
Original Filed May 31, 1930    25 Sheets—Sheet 15

Fig. 23

INVENTORS
Samuel S. Jacobs
BY Walter E. Rooney
John C. Carpenter
ATTORNEY

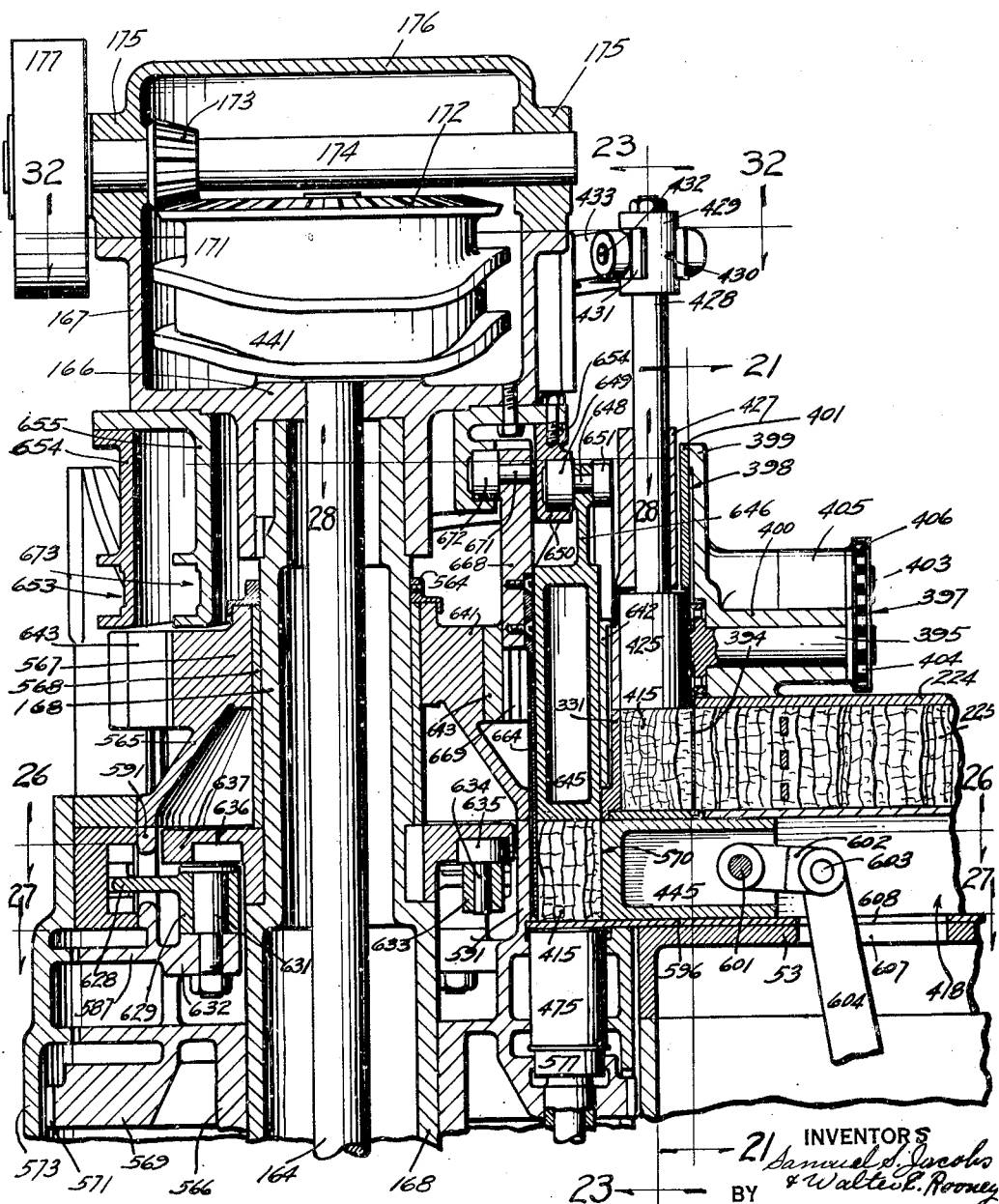

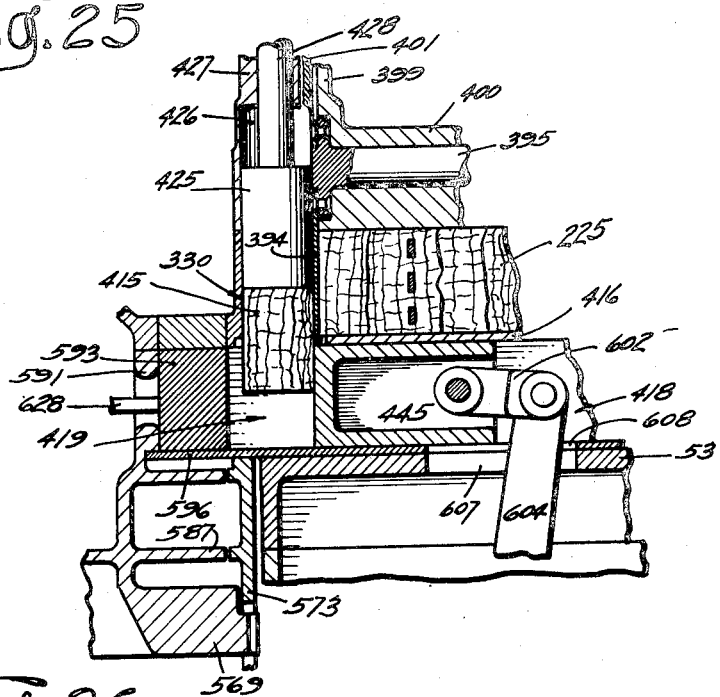
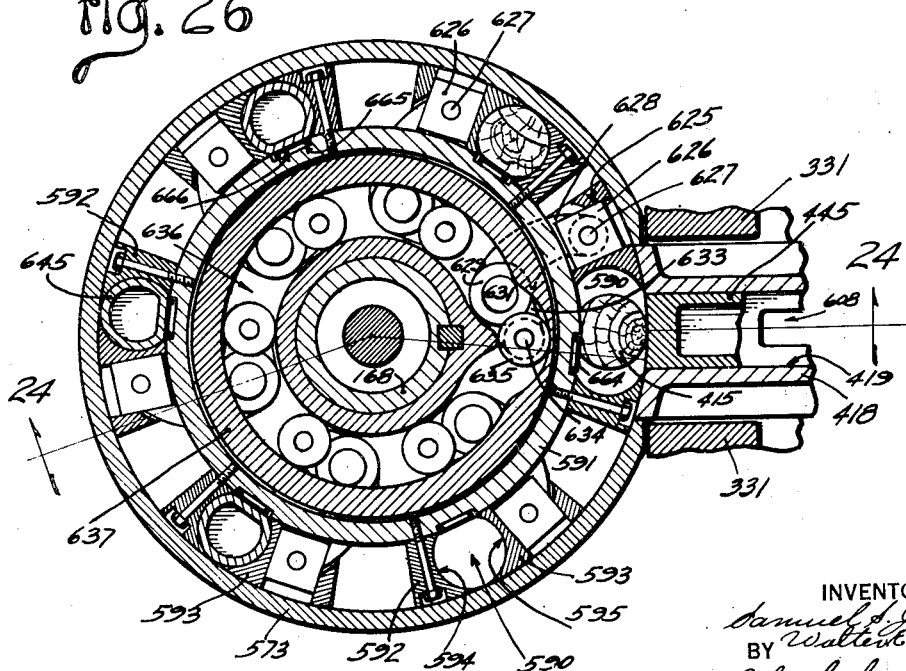

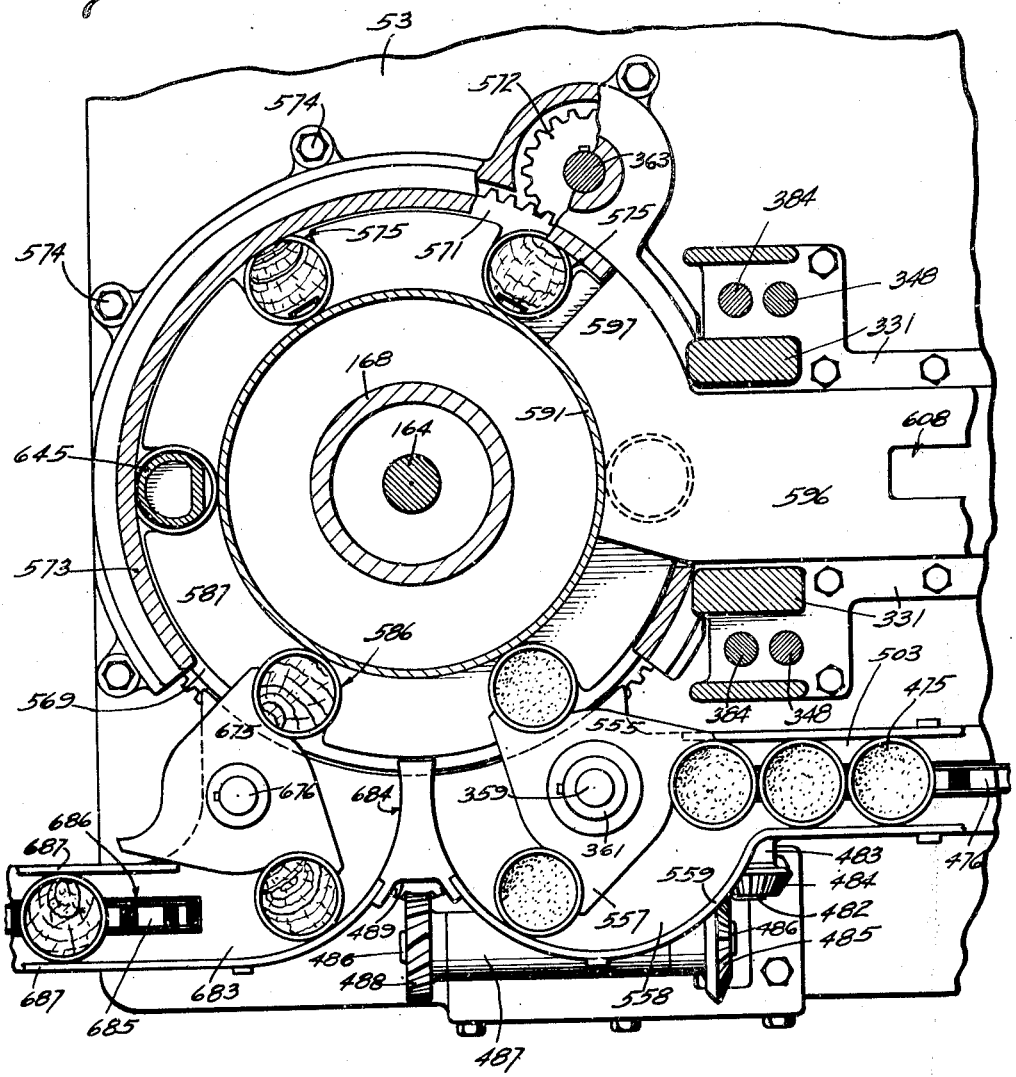

April 21, 1936.  S. S. JACOBS ET AL  2,037,724
FISH CANNING MACHINE
Original Filed May 31, 1930   25 Sheets-Sheet 19
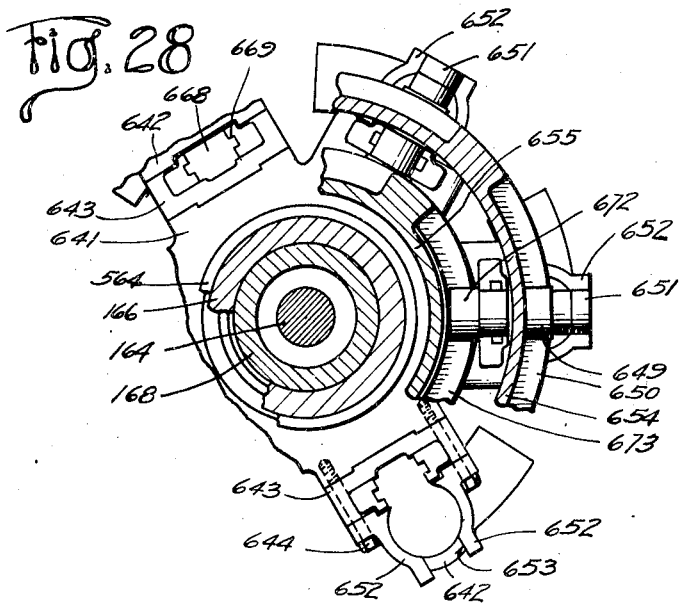
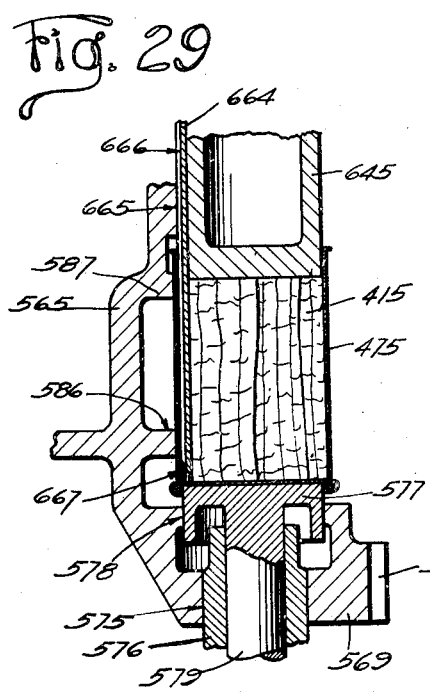
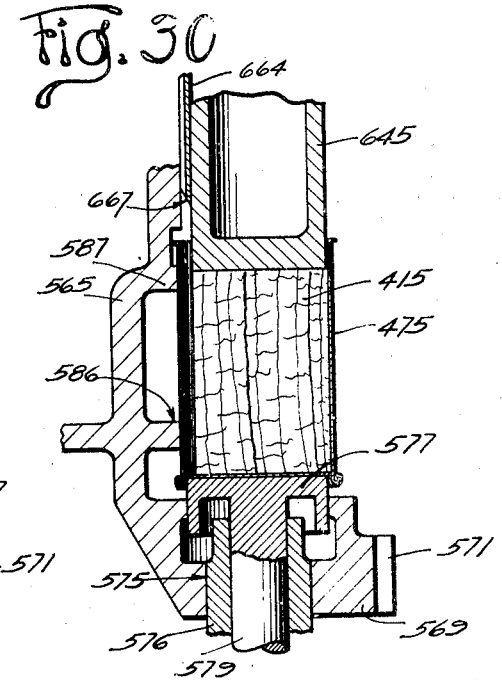
INVENTORS
Samuel S. Jacobs &
BY Walter E. Rooney
John C. Carpenter
ATTORNEY

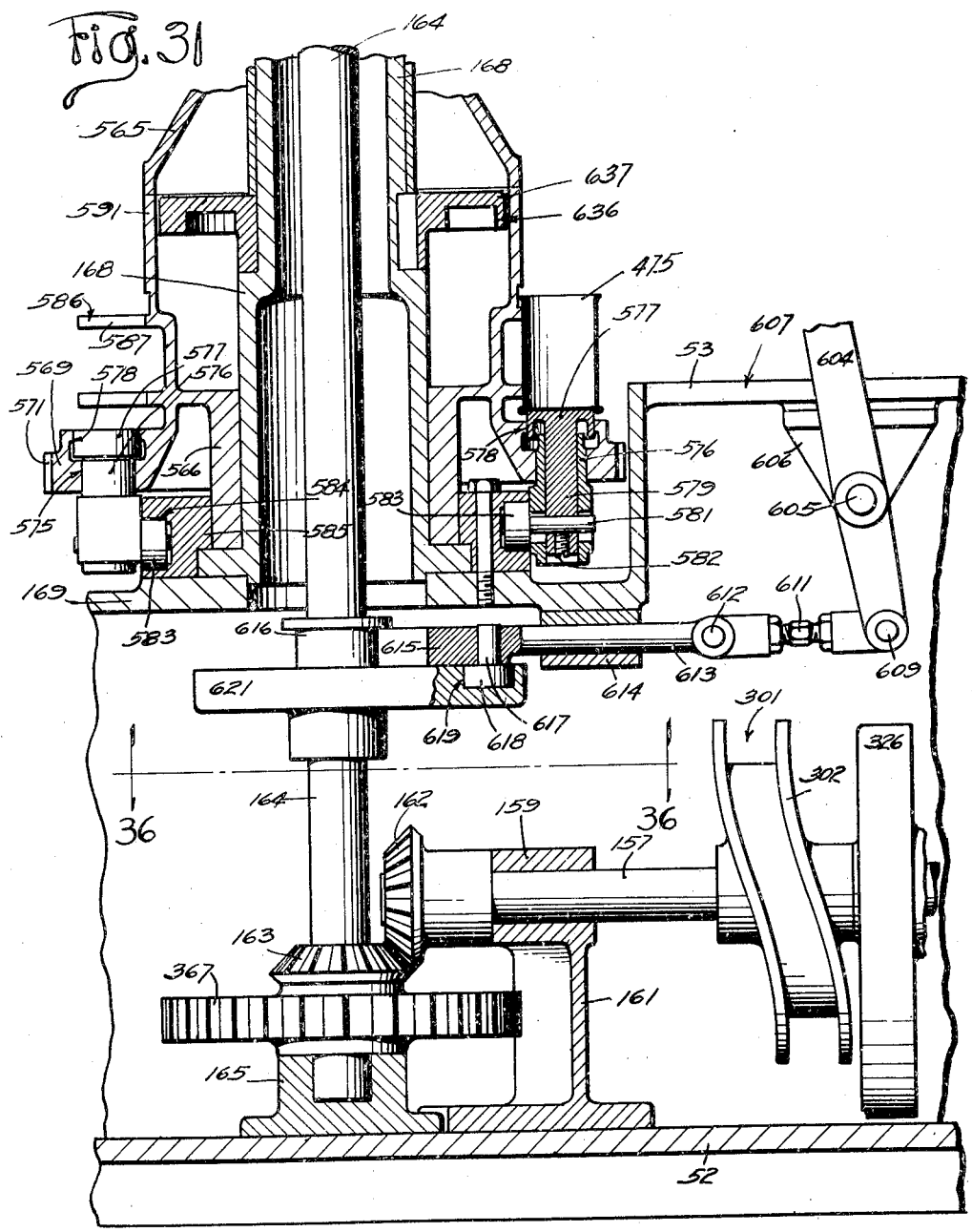

April 21, 1936.  S. S. JACOBS ET AL  2,037,724
FISH CANNING MACHINE
Original Filed May 31, 1930  25 Sheets-Sheet 21
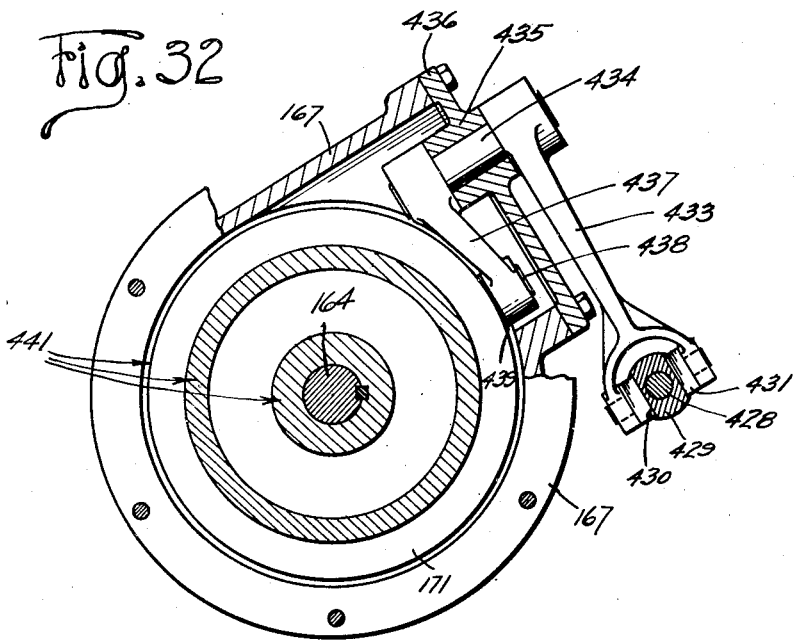
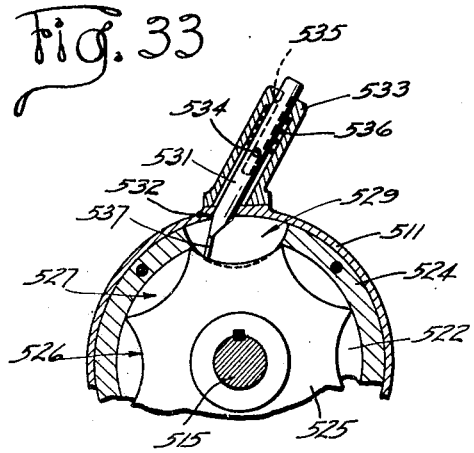
INVENTORS
Samuel S. Jacobs &
BY Walter P. Rooney
John C. Carpenter
ATTORNEY April 21, 1936.   S. S. JACOBS ET AL   2,037,724
FISH CANNING MACHINE
Original Filed May 31, 1930   25 Sheets-Sheet 22
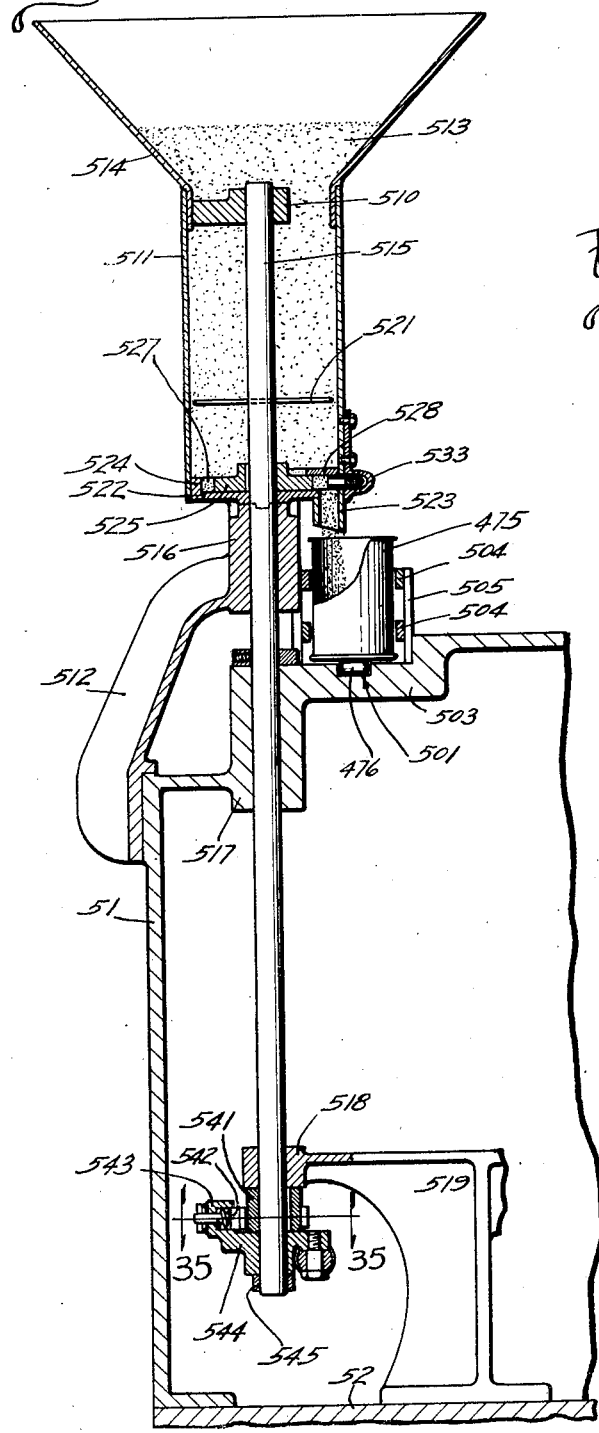
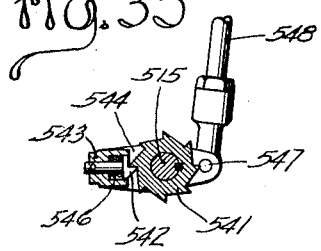
INVENTORS
Samuel S Jacobs &
BY Walter E. Rooney
John L. Carpenter
ATTORNEY

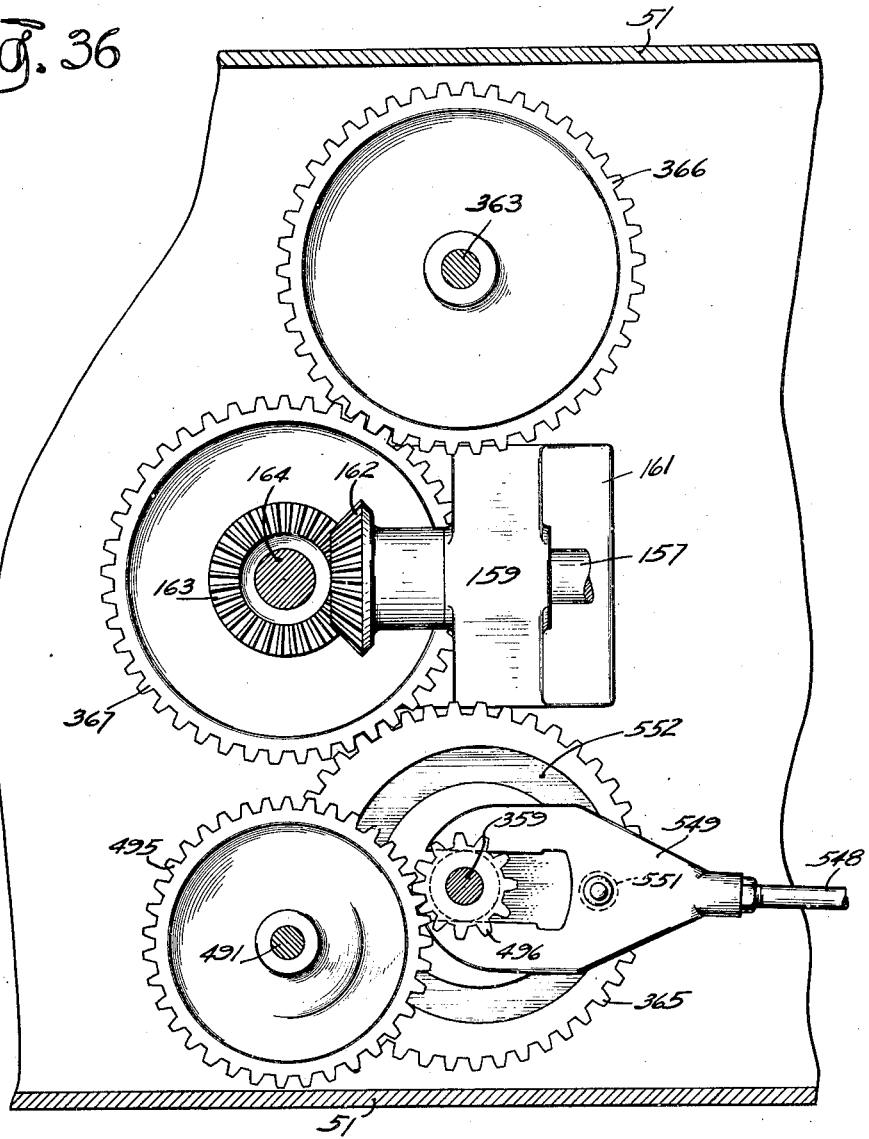

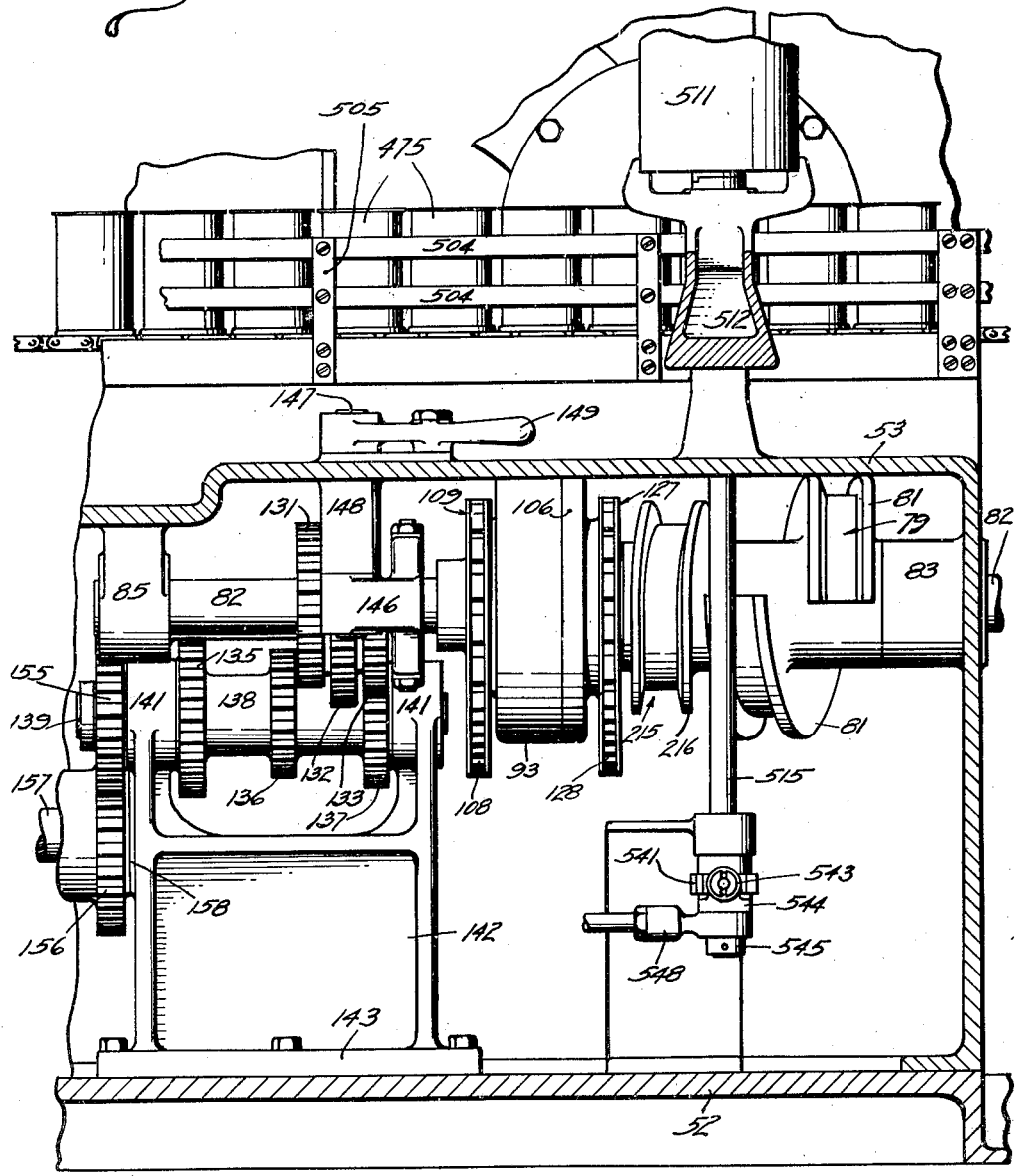

Patented Apr. 21, 1936

2,037,724

UNITED STATES PATENT OFFICE 2,037,724

FISH CANNING MACHINE

Samuel S. Jacobs, San Mateo, Calif., and Walter E. Rooney, Bellingham, Wash., assignors to American Can Company, New York, N. Y., a corporation of New Jersey Application May 31, 1930, Serial No. 458,804
Renewed July 26, 1935

28 Claims. (Cl. 226—101)

The present invention relates to a fish canning machine and has particular reference to an automatic machine wherein whole fish are received and cut into lengths which are then packed into containers.

The principal object of the invention is the provision of an apparatus for filling predetermined amounts of fish into cans, the actual operation of filling for each can being relatively slow while allowing a great number of cans to be filled in a given time.

An important object of the invention is the provision of a fish canning apparatus wherein the amount of fish fed into the machine can be varied independent of the number of cans being fed into the machine.

A further important object of the invention is the provision of an apparatus of the character described utilizing an improved manner of fish filling which provides a more continuous, uninterrupted fish supply with more uniformity of fish sizes along the entire filling line.

An important object of the invention is the provision of an improved fish feed carrier which advances a continuous supply of fish in a step by step movement retaining the fish at definite positions during the rest periods to permit cutting into predetermined lengths and to permit removal of the cut fish from the carrier.

An important object of the present invention is the provision of an apparatus for receiving a continuous line of whole fish in a horizontal position, cutting the fish to can length while in such position and thence packing in an upright or vertical position within a can.

A further important object of the invention is the provision of a fish canning machine receiving fish and conveying it to a cutting station, after which, the cut portions are automatically collected in a magazine and compressed into a predetermined measured quantity of substantially uniform weight which is then packed into a can.

An important object of the invention is the provision of a measuring chamber for a fish canning machine which communicates, during certain periods of operation, with a supply of fish somewhat compressed and which receives a predetermined quantity of fish that is then further compressed for introduction into a can.

A still further important object of the invention is the provision of a can filling mechanism in a fish canning machine which operates to receive a continuous supply of fish and segregate a measured quantity therefrom shaping it to fit a can, this part of the filling operation being carried on at a high rate of speed, and then to transfer the segregated quantity of fish into a can at a relatively slower speed whereby high production is obtained from the apparatus while allowing maximum filling time.

An important object of the invention is the provision of a fish canning machine utilizing different steps of forming and filling operations wherein fish is received as a continuous supply, a measured quantity separated therefrom, the separated fish then being compressed and shaped prior to its introduction into a can, these operations insuring proper can filling.

Numerous other objects of the invention will be apparent as it is better understood from the following description, which, taken in connection with the accompanying drawings, discloses a preferred embodiment thereof.

Referring to the drawings:—

Fig. 2 is a side elevation.

Fig. 3 is an enlarged sectional detail of the cutting and fish carrier devices being taken substantially along the line 3—3 in Fig. 1.

Fig. 4 is an enlarged longitudinal section taken substantially along the line 4—4 in Fig. 1.

Fig. 5 is a perspective detail of a slip clutch illustrated in Fig. 4.

Fig. 6 is an enlarged sectional plan view taken substantially along the broken line 6—6 in Fig. 2.

Fig. 10 is a sectional view taken substantially along the line 10—10 in Fig. 9.

Fig. 11 is a transverse sectional detail of the clutch mechanism being taken substantially along the line 11—11 in Fig. 9.

Fig. 12 is a perspective detail of the clutch flipper.

Fig. 13 is a transverse sectional view taken substantially along the line 13—13 in Fig. 9.

Fig. 14 is a transverse sectional view taken along the line 14—14 in Fig. 6.

Fig. 15 is an enlarged elevation partially broken away and viewed from a plane whose horizontal trace is indicated by the line 15—15 in Fig. 1.

Fig. 16 is a sectional detail taken substantially along the line 16—16 in Fig. 15.

Fig. 17 is a sectional detail of the discharge end of the feeding tunnel and the advancing fork device as shown in Fig. 6, the parts being here shown in a different position.

Fig. 18 is a view similar to Fig. 17 showing the parts in still another position.

Fig. 19 is an enlarged sectional plan view of a portion of the gearing and associated mechanism of the machine being taken substantially along the line 19—19 in Fig. 2.

Fig. 20 is a transverse sectional view taken substantially along the line 20—20 in Fig. 6.

Fig. 21 is a sectional view taken substantially along the line 21—21 in Fig. 6, the section being also indicated by the line 21—21 in Fig. 24.

Fig. 22 is a fragmentary detail of a pivotal connection used between the ends of certain vertical rods and their associated cam arm blocks which are illustrated in Fig. 21.

Fig. 23 is a sectional view taken substantially along the line 23—23 in Fig. 6, the section being also indicated by the section line 23—23 in Fig. 24.

Fig. 24 is an enlarged longitudinal sectional view taken substantially along the line 24—24 in Fig. 1 and illustrating the upper half of the mechanism, the section being also indicated by the line 24—24 in Fig. 26.

Fig. 25 is a fragmentary detail of a part of the mechanism illustrated at the right-hand side in Fig. 24, the movable parts being shown in a different position.

Fig. 26 is a sectional plan view taken substantially along the line 26—26 in Fig. 24.

Fig. 27 is a sectional plan view taken substantially along the line 27—27 in Fig. 24.

Fig. 28 is a fragmentary detail taken substantially along the line 28—28 in Fig. 24.

Fig. 29 is an enlarged sectional detail of a filled can in position in the can turret with the venting device in place in the can.

Fig. 30 is a view similar to Fig. 29 showing the venting device in a different position.

Fig. 31 is an enlarged longitudinal sectional view taken substantially along the line 24—24 in Fig. 1, illustrating the lower half of the machine, the two Figs. 24 and 31 being considered together for the complete section.

Fig. 32 is a sectional plan view being taken substantially along the line 32—32 in Fig. 24.

Fig. 33 is an enlarged fragmentary detail of the lower end of the salting hopper.

Fig. 34 is an enlarged transverse section taken substantially along the line 34—34 in Fig. 1.

Fig. 35 is a sectional detail of the lower end of the salting hopper shaft being taken substantially along the line 35—35 in Fig. 34.

Fig. 36 is a sectional plan view of a part of the gearing of the machine as viewed along the section line 36—36 in Fig. 31.

Fig. 37 is an enlarged part section, part longitudinal elevation taken substantially along the line 37—37 in Fig. 1.

*General construction and operation*

Figure 1:
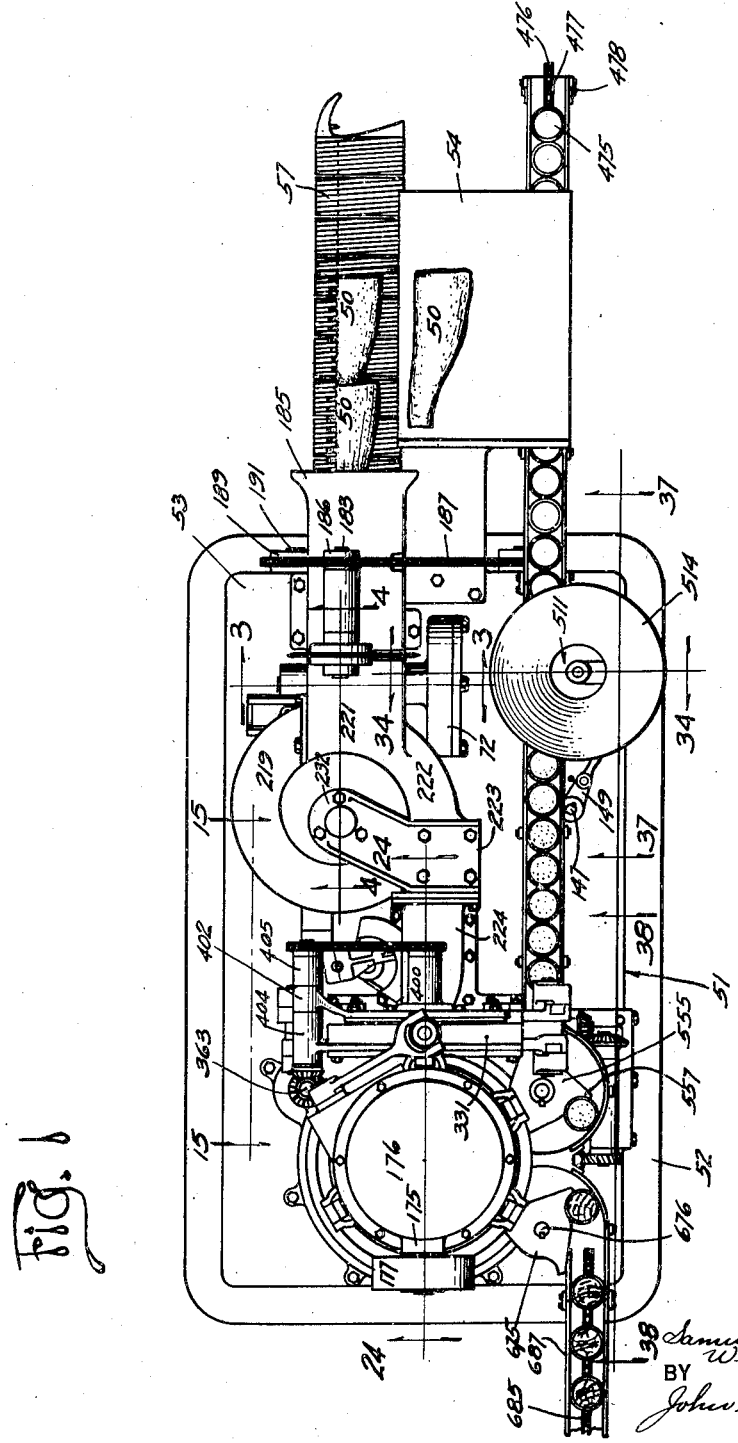
Figure 1 is a plan view of the machine.
Figure 7:
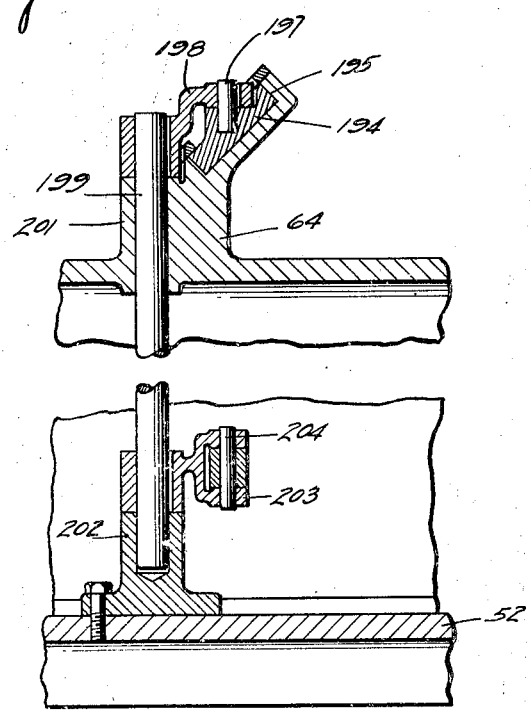
Fig. 7 is a sectional detail taken substantially along the line 7—7 in Fig. 6.
Figure 8:
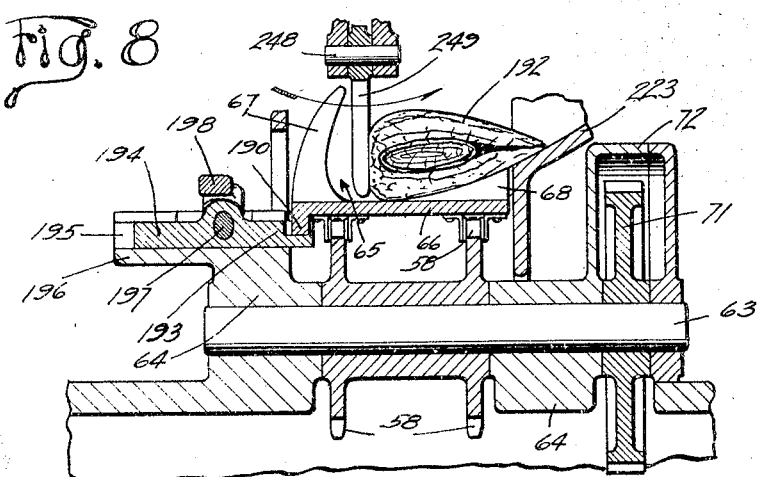
Fig. 8 is a sectional detail taken substantially along the line 8—8 in Fig. 4.

The apparatus disclosed in the drawings, which constitutes a preferred embodiment of the present invention, comprises a number of associated cooperating parts. The machine at its entrance end is provided with an endless chain conveyor which constitutes a carrier for the fish entering the machine. This carrier is formed with a series of buckets arranged close together, those buckets passing on the upper run of the conveyor providing a floor lying in a single horizontal plane. This carrier passes adjacent a feeding table from which the operator places cleaned and drawn fish in a horizontal position on the floor of the conveyor, each fish extending across two or more pockets.

The buckets are open on the side adjacent the operator, permitting unrestricted feeding of whole fish into the carrier. The operator preferably places the fish into the carrier with the small or tail end foremost, the tail of one fish being inserted in the belly of the next preceding fish, thus forming a substantially continuous line of fish having a substantial uniformity in diameter irrespective of the individual fish size. This form of fish feeding permits disposal of the small tail end of the fish in an attractive manner which enhances its appearance in the can into which it is filled.

The fish carrier intermittently advances the fish through a cutting station, the carrier being held in locked position during its rest period to permit severing a predetermined fish section from the fish line, this section being of proper length for the height of can into which it is subsequently filled. The cut fish section is removed from the carrier during the next following rest period and crowded into a feeding tunnel which acts as a supply or magazine, the fish sections being arranged in vertical position within the tunnel and given an initial compression.

The forward part of the fish mass in the tunnel is then moved under this compression into a measuring chamber where a given quantity of the fish sections are segregated from the fish supply in the tunnel magazine. In the measuring chamber, the segregated quantity of fish is further compressed into a formed fish charge which is thence forcibly moved into a transfer chamber positioned directly beneath.

The operations of the machine thus far described are carried on at relatively high speed, the nature of each operation permitting quick movement of the parts. These various movements are intermittent in their action and the formed charge as it rests within the transfer chamber is in position to be transferred into a continuously operating mechanism.

Simultaneously with the receiving and treating of the fish throughout the operations just described, open-ended cans are being received on a continuously moving conveyor. This conveyor moves each can beneath a salting device which discharges a given quantity of salt into the can. The cans are then automatically timed with the other operations of the machine and are placed into a can carrier turret. This turret also carries a series of filling chambers which constitute elements of fish filling units, there being a filling chamber positioned directly above each of the can pockets.

The rotating can carrier turret moves adjacent the stationary transfer chamber into which the formed charge of fish was brought, as previously described, and the fish charge is shifted by a horizontally moving plunger from the transfer chamber into one of the filling chambers as it moves past. Successive fish charges are, in like manner, fed into successive filling chambers. Each filling chamber contains a fixed member and a movable member which determine the chamber volume, the movable member maintaining its filling chamber at its greatest capacity as the charge of fish is received therein.

During the continued rotation of the turret, each filling chamber is contracted on its fish charge and the fish is thereby further compressed into a shape to fit the can. The fully shaped fish charge is then forcibly moved into the aligned can, a venting device cooperating to permit escape of the air during this can filling operation.

To effect the best appearance of the fish filled can, it is necessary that the actual passage of fish into the can be carried out at a relatively slow rate and this part of the canning operation, therefore, is slowest in action of the entire machine. In the present apparatus, sufficient time is given for each filling operation by reason of the improved construction of a multiplicity of filling units carried on a rotating turret, this great number of filling units permitting the filling of a great number of cans in a given time.

The filled can is then moved into a discharge starwheel which carries it out of the turret and onto a discharge conveyor by which it is removed from the machine.

General machine support

The principal parts of the apparatus are supported upon or carried within a housing 51 (Figs. 1 and 2) supported by a base 52. The upper part of the housing 51 is formed with a horizontal wall 53 constituting a table. A feeding table 54 is supported by an entrance bracket 55 secured to one end wall of the housing 51 and braced at its outer end by an adjustable tie rod 56 connected with the base 52. It is from this table 54 that cleaned and drawn fish 50 are placed by an operator upon a fish carrier 57.

Fish carrier

The fish carrier embodies a pair of spaced conveyor chains 58 (Figs. 3 and 4) which operate at the end of the machine over idler sprockets 59 (Fig. 2) carried on a shaft 61 supported on the bracket 55 and which also move interiorly of the machine over a double sprocket 62 keyed to a horizontal shaft 63 journaled in bearings 64 projected upwardly from the table 53.

The conveyor chains 58 carry a series of buckets 65 connected with the links thereof and each formed with a floor section 66 having a slotted back wall 67 and a slotted floor wall 68. The walls 67 and 68 of the buckets 65 form connecting pockets for the reception of the fish 50, the free open side thereof enabling the operator to employ an improved method of positioning the fish on the carrier.

The fish as received by the operator have been cleaned and drawn and have had heads, tails and fins removed. The operator preferably places the small end of each fish forwardly on the carrier with its back against the walls 67, the fish body being empaled on spikes 69, there being one spike projected from each wall 67. As each fish is placed on the carrier its small or tail end is inserted into the belly of the preceding fish resting thereon, as clearly illustrated in Figs. 1, 3 and 4. This method of placing the fish produces a more uniform cross section throughout and provides an extended and continuous line of fish.

The conveyor chains 58 and the buckets 65 carried thereby are advanced with an intermittent motion, the shaft 63 (Fig. 3) for this purpose carrying a gear 71 located within a housing 72 formed integral with the table 53 and meshing with a similar gear 73 (see also Fig. 9) mounted on a horizontal shaft 74 journaled in bearings 75 formed in brackets 76 projected downwardly from the table 53.

The gear 73 constitutes one element of a combined Geneva and cam device, the gear carrying a series of rollers 77 freely turning on studs 78 projected from one face of the gear. Each roller 77 is individually engaged in an interrupted groove 79 of a cam 81 mounted on a sleeve 91 (Fig. 10) which surrounds a horizontal shaft 82, the sleeve being journaled in a bearing 83 projected from one wall of the housing 51 and the shaft 82 being journaled at one end in the sleeve and at the other end in a bearing 84 formed in a bracket 85 projected downwardly from the table 53 (Figs. 13 and 37).

As the cam 81 rotates, its groove 79 passes along the engaged roller partially rotating the gear 73 and through the described connections advancing the conveyor chains 58 a distance equal to the width of one of the buckets 65. As the cam groove 79 leaves the roller, this being at the end of the cam groove, the gear 73 and its connected parts come to rest and remain at rest until the cam 81 has completed its cycle of rotation. The forward end of the cam groove 79 thereupon engages the next succeeding cam roller 77 and a succeeding step movement is again imparted to the conveyor chain 58.

Figure 9:
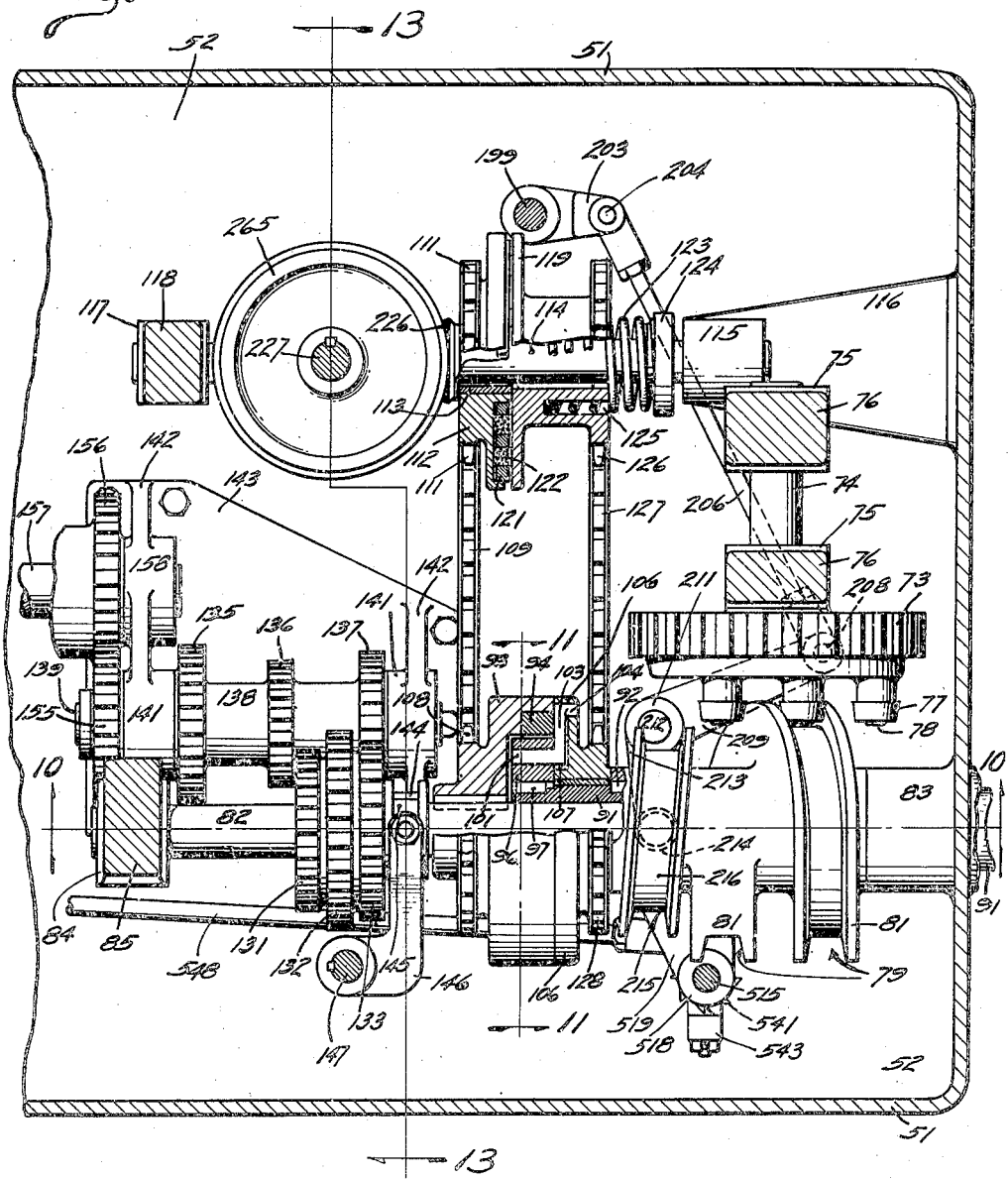
Fig. 9 is an enlarged sectional plan view of part of the gearing of the machine, being taken substantially along the line 9—9 in Fig. 2.

While the cam 81 normally rotates in unison with the shaft 82, provision is made for disconnecting it at certain times for a purpose hereinafter set forth. At such times the feeding of fish is interrupted. For this purpose the cam 81 turns with the sleeve 91 (Figs. 9, 10 and 11) which is loosely mounted on the shaft 82, the cam being keyed to the sleeve as at 92 (Fig. 9). Sleeve 91 constitutes one element of a clutch mechanism of the flipper or dog type interposed between the cam 81 and the continually rotating shaft 82.

The shaft 82 carries the driving element of the clutch proper which comprises a disc 93 (Figs. 9 and 10) keyed to the shaft 82 adjacent one end of the sleeve 91. This disc 93 carries a ring 94 in the inner wall of which is formed a plurality of spaced notches 95. The ring 94 encircles a collar 96 keyed at 97 to and tightly fitted on one end of the sleeve 91. The collar 96 is slotted as at 98 (Fig. 11) and one side wall thereof is formed to provide a circular bearing 99 for a clutch flipper member 101 (see also Fig. 12).

The flipper member 101 has a cylindrical end 102 connected with a radially extending arm 103 formed with a cylindrical projection 104. The part 102 is provided with a laterally extending part forming a flipper blade 105 which, in unclutched position, rests within the slot 98 but which when moved to clutch position extends outwardly into one of the notches 95, as illustrated in Fig. 11. Provision is made for shifting the arm 103 through a connection with its projection 104 to effect clutching and unclutching of the flipper member, this connection being made through a disc 106 provided with a slot 107 in which the arm 103 moves, the end of the slot being engaged by the projection 104.

The disc 93 (Fig. 9) is formed with sprocket teeth 108 over which operates a chain 109 passing over sprocket teeth 111 formed in a disc 112 of a friction clutch device. The disc 112 rotates on a bushing 113 mounted on a horizontal shaft 114 journaled in a bearing 115 carried by a bracket 116 projected from one wall of the housing 51 and in a bearing 117 carried on the lower end of a bracket 118 (see also Fig. 13) extending downwardly from the table 53.

The disc 112 operates adjacent a disc 119 mounted upon and keyed to the shaft 114. A friction clutch ring 121 having suitable friction corks 122 or other friction elements is interposed between the discs 112 and 119 and normally forms a driving connection therebetween. A spring 123 is interposed between the disc 119 and a collar 124 carried on the shaft 114, one end of the spring resting within an annular groove 125 formed in one end of the disc 119. Unless there is a restriction against the normal turning of the shaft 114, as will be hereinafter fully described, the spring 123 is sufficient to hold the ring 121 and the discs 112 and 119 in driving relationship one with the other.

The disc 119 is provided with sprocket teeth 126 over which operates a chain 127 which also passes over other sprocket teeth 128, formed in the disc 106. The driving connection between the discs 112 and 119, just referred to, does not carry these parts together in a uniform rotation but owing to a different tooth ratio between the sprockets 111 and 126 the disc 112 gradually creeps ahead of the disc 119.

This throws a uniform pull on the chain 127 and the disc 106 is driven in its forward direction of rotation with a pull forward tending to move the disc 106 ahead of the disc 93, but this tendency to move ahead is blocked by the flipper member 101 interposed between the discs. The pull, however, does hold the arm 103 of the flipper over toward one side of the slot 107 by urging it in a clockwise direction of rotation (Fig. 11) and keeping the flipper blade or dog 105 in clutch position.

The shaft 82 is continually rotated by connection with the drive shaft of the machine, there being used for this purpose a gear transmission consisting of change gears for varying the speed of travel of the fish carrier 57 and other associated parts hereinafter described. This transmission, as best illustrated in Figs. 9, 10 and 13, comprises a set of three gears 131, 132 and 133 formed as an integral gear block and sliding along a feather 134 set in the shaft 82. These gears 131, 132 and 133 are adapted to selectively mesh with other gears 135, 136 and 137 formed as an integral part of a sleeve 138, keyed to a horizontal shaft 139, which is journaled in bearings 141 carried in a bracket 142 formed with a base 143 mounted upon and secured to the base 52.

The gear block containing the gears 131, 132 and 133 is slid along the shaft 82 to insure proper meshing with the desired gear of the sleeve 138, the gear block having a grooved extension 144 (Figs. 9 and 13) which is engaged by a pair of blocks 145 carried on the forked end of a yoke 146 pivoted on a vertical stud shaft 147, (see also Figs. 1, 2 and 37) oscillating in a bearing 148 formed in the table 53. The upper end of the shaft 147 is secured to an operating handle 149 which is manually shifted into one of its three positions to selectively bring one of the three gears of the gear block into proper mesh with one of the three gears on the sleeve 138.

This permits a change of speed of operation of the fish carrier and certain other operating parts relative to other filling operations of the machine. This speed shift is used to adapt the feeding of fish of a certain size in sufficient quantity to fill cans of a certain size. For example, in filling a can of given size when the size of fish runs small, more fish are required to fill the cans and the carrier will preferably run faster to provide the proper supply. In packing larger fish into the same size of can, the carrier will preferably run slower to feed the desired predetermined charge of fish to the can filling devices.

The shaft 139 (Figs. 9, 13 and 19) carries a gear 155, which meshes with a gear 156 carried on a horizontal shaft 157, journaled in a bearing 158 formed in the bracket 142 and in a bearing 159 (see also Fig. 31) formed in a bracket 161 carried by the base 52.

The shaft 157 carries a bevel gear 162, which meshes with a gear 163, carried on the bottom end of a vertical shaft 164 resting upon and journaled in a bearing block 165 carried by the base 52 and also journaled in a bearing 166 (Fig. 24) formed in a gear casing 167 carried on the upper end of a column 168 mounted upon a depressed section 169 of the table 53. The upper end of the shaft 164 carries a cam 171, the top edge of which is provided with gear teeth 172 which meshes with a pinion 173 secured to a drive shaft 174 journaled in bearings 175 formed in a casing cover 176 resting upon and bolted to the gear casing 167. The drive shaft 174 carries a pulley 177 by means of which power is applied in the usual manner for rotating the shaft 174.

Fish cutting

Provision is made for positively locking the conveyor chains 58 in fixed position at each of their rest periods thereby insuring exact positioning of each bucket 65 to permit severing of a section of one or more fish overlying the edge of the bucket (Fig. 4) toward the forward end of the upper run of the conveyor. This severing or cutting mechanism is perhaps best illustrated in Figs. 3 and 4 and comprises a thin segment shaped cutting blade 181 formed with a chamfered cutting edge 182 which engages the fish resting in two adjacent buckets 65, the blade passing between these buckets in cutting the fish.

The cutter blade 181 is carried on a horizontal shaft 183 journaled in a bearing 184 projected from the upper surface of a tunnel extension 185 (see also Figs. 1 and 2) carried on the table 53. It is through the central passageway of this tunnel extension that the fish on its carrier passes after leaving the table 54. The shaft 183 is normally continually rotated, the shape of the cutting blade being such as to permit clearing of the buckets 65 during their forward advance movement.

For rotating the shaft 183 (Figs. 1, 2, 3 and 4) a sprocket 186 is mounted thereon over which operates a chain 187 passing over a sprocket 188 secured to the end of the sleeve 91 (see also Fig. 10) and over an idler sprocket 189 mounted on a stub shaft 191 projected from the bracket 55. This connection between the cutting device and the sleeve 91 insures operation of the cutting device only during a corresponding fish feeding operation.

Fish carrier locking device

The locking device for holding the fish carrier in exact position during its rest period (Figs. 4, 6, 7 and 8) successively cooperates with each bucket 65 as it comes to rest in the position following that occupied by it during the cutting operation. This position will be referred to as the locking position and the bucket 65 in this position, with its cut length or section of fish (indicated by the numeral 192), rests with its wall 66 inclined approximately forty-five degrees from the horizontal. The spike 69 retains the fish section on its bucket 65 as this angular position is assumed.

The rear edge of the bucket in the locking position is engaged by a forward notched end 193 (Fig. 8) of a slide 194 operating within a guideway 195 formed in a bracket 196 projecting outwardly from one of the bearings 64. As disclosed in Fig. 7, this slide 194 is also at an incline within its guideway 195 in order to match with the floor 66 of the bucket, this insuring the proper engagement of its end 193 under a projecting rib 190, which is formed on the underside of the rear edge of the floor 66 of the bucket.

The slide 194 is cam operated being pivotally connected at 197 to an arm 198 carried on the upper end of a vertical shaft 199 oscillating in a bearing 201 formed as an integral part of the bearing 64, the shaft also resting within and having movement relative to a bearing block 202 carried by the base 52. The shaft 199 (see also Fig. 9) carries an arm 203 which is pivoted at 204 to an adjustable connecting rod 206 pivoted at 208 to an arm 209 of a bellcrank lever 211 oscillating on a vertical shaft 212 carried by the base 52.

A second arm 213 of the bellcrank lever 211 carries a cam roller 214 which operates within a cam groove 215 of a cam 216 (see also Fig. 10) formed as an integral part of the cam 81. The holding of the bucket 65 in locking position by the described locking device also holds the conveyor chain and all of the other buckets in exact position. This locked bucket is, therefore, in proper position for the removal of the fish section 192 from the bucket as will now be described.

Fish feed tunnel and feed device

The cut fish sections are removed from their conveyor buckets by feeding fork devices which sweep the fish from their holding spikes and out of the open side of the buckets. The fish sections are conveyed in a circular path and at the same time are lifted and partially turned into a vertical position where they are crowded one against the other into a space constituting a fish storage or magazine. This transfer of the fish sections from their pockets into the magazine takes place within an enclosed casing which is herein referred to as a tunnel.

This tunnel is of general rectangular shape in cross-section and, as best shown in Figs. 1 and 2, is circular adjacent the end of the fish conveyor chain where it communicates with the tunnel extension previously mentioned. This circular end provides a helical path along which the fish sections are guided into the magazine. The opposite or forward end of the tunnel is extended along straight lines providing a pass for the vertically positioned fish sections.

Other advancing fork devices are located adjacent the forward part of the tunnel and operate through a side wall thereof, a forked element first entering into the fish sections, then by a rotary sweep forcing those fish sections, which are ahead of the fork, toward the exit end of the tunnel. At this exit end, the tunnel communicates with a measuring chamber which will be explained in detail under the following sub-section of description.

The feeding fork devices for placing the fish into the tunnel operate under the control of an adjustable spring element which insures only a predetermined quantity of fish in the magazine. When more fish is brought into the machine by the fish carrier than is removed from the exit end of the tunnel, the fish carrier and the fork feeding devices automatically cease operating and permit the other operations of the machine to catch up. When a sufficient quantity of fish has been removed from the magazine to again restore normal conditions, the parts which have been stopped automatically begin operating.

Those later advancing fork devices, positioned in the forward end of the tunnel, also operate under control of adjusted spring elements which insure the feeding of a substantially uniform quantity of fish from the exit end of the tunnel and into the measuring chamber. This automatically operates to force the proper amount of fish out of the tunnel by compressing it in accordance with the adjusted spring elements connected with the advancing fork devices. These adjustable and automatically operating features will now be described in detail.

The cut fish 192 held in the locked bucket 65 is at the entrance end of the feed tunnel, this end being designated by the numeral 221 (Figs. 1, 2, 4 and 6). The tunnel at this end is shaped to accommodate the discharge end of the fish carrier 57 but diminishes in cross-section as it extends around into a helical section 222 terminating into a rectangular section 223 which in height is just sufficient to accommodate the cut length of the fish sections 192. The tunnel section 223 communicates directly with a restricted substantially straight tunnel section 224, the exit opening of which is substantially smaller than its entrance cross-sectional area.

A semi-circular housing 219 (Figs. 1, 4 and 6) is secured to the tunnel casing adjacent the sections 221 and 223 and completes the enclosure at the forward end of the tunnel, this housing enclosing the fork feeding devices moving therein.

The fish sections 192 are advanced through the helical tunnel section 222 and are brought into the tunnel section 223 where such fish parts (Fig. 6) will be designated by the numeral 225. The tunnel acts as a magazine or storage for the fish sections which are closely packed against each other as illustrated in this figure. This detail of feeding operation will now be considered more fully.

The feeding device for transferring the fish section 192 comprises a turret form of feeding instrumentality preferably embodying three complete fork units. Each fork unit (Figs. 4 and 6) engages behind the fish resting in its bucket and sweeps it into the magazine space as its turret rotates. A turret frame 226 is provided and is keyed to and carried by a vertical shaft 227 journaled in bearings 228 (see also Fig. 13) formed in a tubular member 229 mounted upon and bolted to the table 53. The upper end of the turret frame 226 engages the lower end of the hub of a face cam 231 which is supported by a bracket 232 secured to the tunnel frame section 223, see also Fig. 1.

This turret frame 226 (Figs. 4 and 6) is in the form of a spider having three pairs of arms 235, the upper arm of each pair providing a bearing 236 in which is loosely positioned a sleeve 237, the lower arm of each pair providing a bearing 238 for a similar sleeve 239. Each sleeve 237 is in axial alignment with its companion sleeve 239, the two sleeves encircling a vertical shaft 241. The sleeve 237 is normally and yieldingly locked to its companion by a slip clutch connection disclosed in Figs. 4 and 5.

A collar 242 is clamped on the lower end of the sleeve 237 and retains one end of a spring 243 which encircles the sleeves 237 and 239 at their junction, the opposite end of the spring being held by a pin 244 projected from the wall of the sleeve 239. A tongue and groove connection at the junction of the sleeves is provided between the lower face of sleeve 237 and the upper face of sleeve 239, the former being slotted as at 245 and in this slot a tongue 246, formed on the sleeve 239, extends. The tongue portion of the sleeve 239 is of less width than the slot 245 permitting movement of the slip clutch. The spring 243 normally holds one side of the tongue against one side of the slot and while so held both sleeves move as a unit, this being during normal operation of the machine.

Each sleeve 239 is provided with spaced projections 247 forming a bearing for a pivot pin 248 on which a fork member 249 is mounted. As the fork members are carried around with the rotating turret frame 226, the tynes or prongs of one of these members pass into and through the slots of the wall 67 of the bucket 65 locked in position by the slide 194 and engaging behind the cut fish section 192 (Fig. 6) force it off of its spike 69 and slide it along the tunnel passage. A floor portion 233 (Fig. 6) of the tunnel supports the weight of the fish section 192 at such a time and the helical form of the tunnel elevates the fish section and guides it in its circular path of travel. The fork member, at the same time, is shifted vertically during its rotary movement in accordance with this helical path of travel.

Each shaft 241 (Fig. 4) is raised and lowered by cam action to provide the proper vertical movement for the fork member. A shouldered bolt 254 is threadedly secured in the lower end of the shaft 241 and provides a pivotal support for a block 255 having a curved inner face 256 formed to correspond with the outer wall of a cam 257 formed as an integral part of the stationary tubular member 229. The block 255 carries a pin 258 on which is loosely mounted a cam roller 259 which engages and operates within a cam groove 261 formed in the cam 257. As each fork unit is carried around with the frame 226, the roller 259 associated with that unit follows the cam groove 261, the curved face of the block 255 fitting the cam periphery sufficiently close to hold the roller in its cam groove.

Provision is made for oscillating the sleeves 237 and 239 within their respective bearings 236 and 238 and a corresponding oscillation of the fork member 249 takes place relative to its shaft 241. Different positions of the parts during different stages of such oscillation are shown in Fig. 6.

One fork member 249 is thus illustrated as removing the cut fish 192 from its bucket 65, this fork extending substantially in line with the axis of the turret. As the fish section 192 is moved along the passageway of the helical section 223 of the tunnel the sleeves 237 and 239 are shifted to another position together with the shaft 241 to place the fork member 249, shown adjacent, into position for proper compression on the fish sections 225 and at the proper angle to permit the lateral pulling away of the fork from the fish. Following this compression action, the fork member 249 is withdrawn from the fish sections 225 and the sleeves and shaft move into position to clear the inner wall of the circular casing 219, this being shown by the position of the third fork member.

This shifting of the sleeves 237 and 239 and the shaft 241 (Fig. 4) is effected by the cam 231, each sleeve 237 carrying a projecting arm 261 which is located above its bearing 236 and is provided with a cam roller 262 which traverses a cam track 263 formed in the stationary cam 231.

It will be evident from a consideration of the operations just described that the fork members 249 are controlled at all points in their travel around the center of the shaft 227, this control being vertically as each fork member moves on its pivot 248 and horizontally oscillatory as the member moves with the shaft 241 and the sleeves 237 and 239. By such control the fork member 249 is properly positioned as it approaches the locked bucket 65 and its prongs pass through the slotted wall 67 of the bucket. The proper feeding of the cut fish 192 through its circular and helical path of travel is also insured as well as the proper crowding of the fish toward the restricted section 224 of the tunnel. In this latter movement the fish is forced against and along a series of slats 250 located on the interior of the tunnel. These slats 250 also act as stripping devices for removing the fish sections from the fork member, as previously described.

An abnormal feeding condition may take place where a fork member 249 meets with resistance (as occasioned by an overcharge of fish in the tunnel) and at such a time its spring 243 yields permitting a shifting of the sleeve 237 relative to the sleeve 239, this preventing damage to the machine by allowing sufficient time for the clutch members 112, 113 and 93 and 106 to function. When there is this slipping of the parts 237 and 239, there is a corresponding resistance against the free rotation of the shaft 227 and the clutch members just referred to stop further feeding of the fish by the carrier as will now be described.

The shaft 227 (Figs. 9 and 13) is normally rotated by the shaft 114, the former shaft carrying at its lower end a bevel gear 265 which meshes with a pinion 266 secured to the shaft 114. As long as normal unresisted operation of the fork members 249 takes place, the chains 109 and 127, as previously described, hold the clutch parts 93 and 106 together allowing them to drive the sleeve 91 from the shaft 82, the latter shaft also driving the shaft 114 through the friction clutch.

When the shaft 227 is blocked against rotation the friction clutch parts 112 and 119 slip and through the chains 109 and 127 effect a change in position between the members 93 and 106 which withdraws the flipper blade 105 from its seat in the notch 95. This disconnects the sleeve 91 from the shaft 82 and the clutch members 112, 119 and 93 idly move with the rotating shaft 82 thus avoiding damage to either the fish or the machine.

This stopping of the parts is normally caused by the action of the fish carrier and feeding forks feeding fish into the tunnel at a faster rate than the fish is removed from it. Whenever the resistance against the turning of the shaft 227 is relieved, however, the friction clutch will immediately re-engage the discs 112 and 119 and the flipper blade 105 will thereupon be seated in the next presented notch 95 of the disc 93. The sleeve 91 with all of its driven parts will thereupon automatically resume operation. In this way a uniform amount of compression of the fish and a resulting uniform quantity of the total fish mass is maintained in the magazine and this fact greatly assists in regulating a uniform final fill into the can. The strength of the spring 123 controlling the friction in the friction clutch thus determines the amount of the fish in the magazine.

An advancing fork device, heretofore casually mentioned, is provided for moving the fish sections 225 along the forward end 224 of the tunnel, partially crowding these sections through the tunnel's restricted end opening and into the measuring chamber with which the tunnel is connected. This advancing fork device operates through one side of the tunnel wall and comprises a fork member 271 (Figs. 6, 14, 17 and 18) bolted to an arm 272. The prongs of the fork 271 slide within a vertical shaft 273 carried in a boss formed in a wall 274 of an oscillating member 275. The wall 274, in cross-section, is formed to the arc of a circle and slides back and forth along the wall of a slot 276 cut in the rear wall of the tunnel section 224, the wall of the slot closely fitting the wall 274.

The member 275 is mounted upon an enlarged head 277 of a vertical shaft 278 journaled in a tubular standard 279 secured to the table 53 and in a bearing 281 formed in the table. Oscillation of the shaft 278 moves the circular wall 274 of the member 275 back and forth and this wall, at all times, closes the slot 276 in the side of the tunnel section.

The shaft 278 at its lower end carries an arm 282 (Figs. 14, 16 and 19) which is slotted as at 283. A block 284 having a separate shank 285 extends through the slot 283 and is held in an adjusted position on the arm 282, a washer 286 and locknut 287 being used for this purpose. Adjustment along the slot 283 to position the shank a given distance from the shaft 278 determines the amount of oscillation of the shaft 278 and the corresponding movement of the advance fork device for its feeding stroke. The block 284 as well as the shank 285 are slotted horizontally as at 288 and through this slot slidingly projects a reduced end 289 of a horizontal rod 291 pivoted at 292 on an arm 293 of a bellcrank lever 294.

The bellcrank lever oscillates on a fixed vertical shaft 295 held in a boss 296 projected downwardly from the table 53. A collar 297 pinned to the lower end of the shaft 295 retains the bellcrank on the shaft in working position. A second arm 298 of the bellcrank lever carries a cam roller 299 which operates in a cam groove 301 of a barrel cam 302 secured to the shaft 157.

A coil spring 303 surrounds the end of the reduced portion 289 of the rod 291 and is interposed between a collar 304 resting against the block 284 and a second collar 305 adjustably held on the end of the rod 289 by a locknut 306. This forms a yielding connection between the block 284 and the rod 291 the spring, during normal operation of the machine, holding the arm 282 connected with the rod 291 so that it oscillates under the action of the cam 302. By means of the collar 305 and locknut 306, compression on the spring 303 can be varied.

On each oscillation of the bellcrank 294 and corresponding movement of the rod 291, the spring 303 yields and permits some sliding of the rod 289 through its slotted connection 288. In other words, oscillation of the member 275 and feeding of the fish sections by the fork prongs 271 is not positive but is under the yielding action of the spring 303. By adjusting the compression on the spring 303 an exact compression upon the fish mass is possible and this results in a more uniform weight and amount of fish finally filled into a can.

A comparison of Figs. 6, 17 and 18 should now be had wherein there are illustrated different stages of feeding action of the advancing fork device. The fork 271 engaging the fish sections, as illustrated in Fig. 6, advances them forwardly to the position shown in Fig. 17. The fork 271 is then withdrawn from the mass of fish, moving out of the tunnel section 224, as illustrated in Fig. 18. It is while the fork is in this retracted position that the members 274 and 275 are returned to their former position by oscillation of the shaft 278.

This advancing of the fork into the fish mass at the beginning of the feeding stroke and its retraction at the end of the stroke is produced by a shifting action of the arm 272 which is loosely connected with an arm 311 (Figs. 6 and 14) of a ball and socket joint 312. The arm 311 is keyed on a horizontal rockshaft 313 journaled in bearings 314 (see also Figs. 15 and 16) projected upwardly from the table 53.

The shaft 313 carries an arm 315 pivotally connected at 316 to an adjustable connecting rod 317, the opposite end of which is pivoted at 318 to the upper end of a lever 319 pivoted on a horizontal stub shaft 321 carried in a bracket 322 bolted to the base 52. The lever 319 carries a pin 323 on which is mounted a cam roller 324 operating in a groove 325 of a face cam 326 keyed to the shaft 157.

*Measuring chamber and compression elements therein*

The measuring chamber into which the fish sections are fed is adapted to have an open position at which time the interior of the chamber is relatively large and to have a closed position when the chamber is defined within substantially cylindrical walls having a total volume slightly less than the volume of the can into which the fish is subsequently filled. The height of the chamber remains constant in open or closed position but its horizontal area varies, two opposed side walls thereof being formed by moving members which when separated provide for the enlarged capacity of the chamber and, when brought into closer position, for the limits of the closed chamber.

As the fish sections are passed through the restricted opening of the tunnel, the chamber is at its greatest capacity and after it has been filled with fish sections, the opposed side walls advance toward one another compressing the fish mass into a substantially cylindrical form.

Also, included within the chamber casing and located adjacent the sliding opposed side walls, are sliding slicing gates which, in open position, allow free passage of the fish sections into the chamber. After the enlarged chamber has been filled, these sliding gates are brought together and cut through the fish mass from opposite sides thereby segregating the fish charge confined within the measuring chamber from the fish remaining in the feeding tunnel.

These sliding gates are provided with a longitudinal central opening in which operates a segmental gate saw rotated in synchronism with the movement of the chamber sliding wall members and the sliding gates. This gate saw passes through the opening in the sliding gates and trims any ragged edges of fish material which may have been caught between the inner ends of the sliding gates during their closing movement. This trimming action completes the segregating of the measured quantity of fish within the measuring chamber from the fish sections still remaining in the forward end of the tunnel. The mechanism for performing the operations associated with the filling of the measuring chamber will now be described in detail.

A pair of opposed sliding rounding up jaws 332 provide walls for the two ends of the measuring chamber, this chamber being designated by the numeral 330. The inner faces of the end walls are rounded at 333 to shape the fish deposited therein into a generally cylindrical shape. The jaws 332 are in their retracted position and the chamber is at its largest capacity, (Figs. 6 and 17) when the fish sections 225 are moving into the chamber.

Each jaw 332 is bolted to a plate 335 (Figs. 6, 15 and 23) moving in a guideway and having a tongue and groove sliding connection 336 in the frame 331, this connection insuring proper alignment of the plate 335 at all times. Each plate 335 is provided with a vertical slot 337 in which moves a connection block 338 carried by a pin 339 having pivotal engagement in the upper end of an arm 341 of a bellcrank lever 342 pivoted on a shaft 343 carried in a bearing 344 projected from the frame 331.

A second arm 345 of the bellcrank lever 342 is provided with a slot 346 formed in its end and a block 347 operates therein forming a sliding pivotal connection with a vertical rod 348 sliding within the frame 331 and within a bearing 349 projected downwardly from the table 53. The lower end of the rod 348 (Figs. 22 and 23) carries a block 351 which engages a slotted end 352 of an arm 353 secured to a horizontal stub shaft 354 carried in a bracket 355 (see also Figs. 19, 20 and 21) bolted against the under surface of the table 53.

Figure 38:
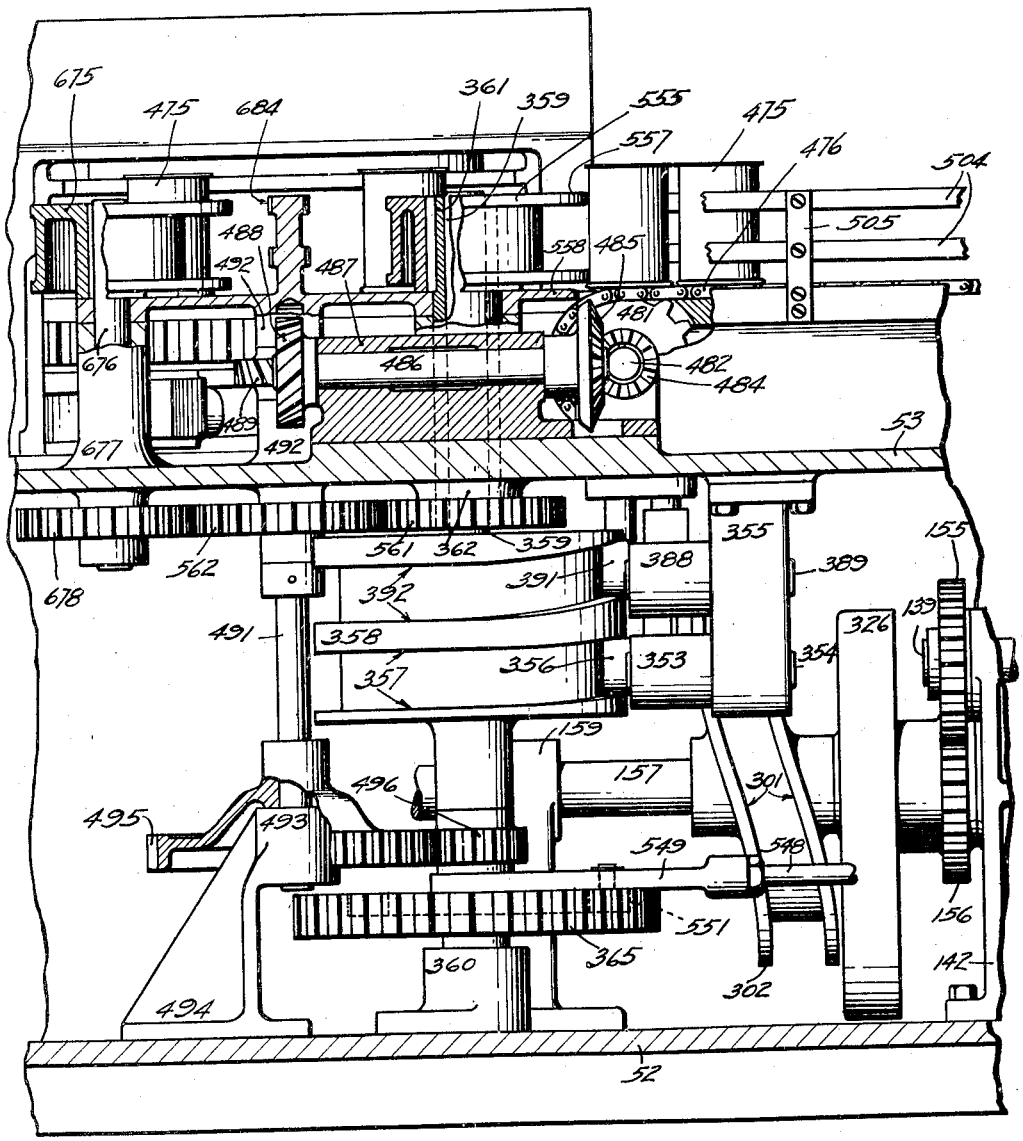
Fig. 38 is an enlarged sectional view taken substantially along the line 38—38 in Fig. 1.

Each arm 353 carries a cam roller 356 which operates within a lower cam groove 357 of a double cam 358. The cam 358 on the front side of the machine is secured to a vertical shaft 359 (Figs. 19, 23, 27, 36 and 38) journaled in a floor bearing 360 (Fig. 38) carried by the base 52 and also in a sleeve 361 (Figs. 19 and 38) journaled in a bearing 362 formed in the table 23. Cam 358 on the rear of the machine is secured to a vertical shaft 363 journaled in a bearing 364 formed in the table 53 and in a floor bearing, not shown, similar to the bearing 360.

The shaft 359 (Fig. 36) carries a spur gear 365 and the opposite shaft 363 carries a gear 366. The gears 365 and 366 both mesh with a central gear 367 (see also Fig. 31) which is secured to the shaft 164 and is located directly beneath the gear 163. The gears 365 and 366 being of the same size effect a uniform rotation of shafts 359 and 363 with a corresponding uniform action of the cooperating jaws 332 in the measuring chamber 330.

Also associated with the chamber 330 and sliding adjacent the jaws 332 within the frame 331 are the pair of slide gates already mentioned, each gate consisting of two plates 371 (Figs. 6 and 21) bolted together at their outer ends by bolts 372, each pair of bolted plates being secured to a slide 373. The gates 371 move to a position where their inner edges almost touch, thereby forming a side wall for the measuring chamber, as the jaws 332 are compressing the charge of fish therein.

In Fig. 6, both the jaws 332 and the gates 371 are in backward position, the chamber being empty, and as the mass of fish moves therein (Fig. 17) both jaws and gates move to compress it. The chamber 330 is vented along one side by holes 369 which permit the escape of air as the chamber is being loaded and these holes are closed by the sliding jaws 332 as the fish mass is compressed.

The cylindrical faces 333 of the jaws 332 when in closed position cooperate with beveled edges 374 of the gate members 371 to form a continuous compressing wall. The gates 371 in closed position (Fig. 18) extend inwardly beyond the jaws 332, these gates in their inward movement slicing off and segregating the quantity of fish in the measuring chamber from the remaining fish mass in the end of the tunnel section 224.

The actuating devices for moving the gates 371 are similar in construction to the moving parts associated with the jaws 332, each slide 373 in the present instance being provided with a vertical slot 375 (Figs. 6 and 20) in which operates a block 376 provided with a pin 377 which forms a pivotal connection with the end of an arm 378 of a bellcrank lever 379 oscillating on a horizontal shaft 380 (Fig. 15) held in a bearing 390 formed in the frame 331 in a manner identical with the shaft 343 and its bearing 344. A second arm 381 (Fig. 20) of each bellcrank lever 379 is provided with a slotted end 382 having pivotal connection with a block 383 which is similar in construction to the block 351 on its shaft 348, the block 383 being carried on the upper end of a vertical rod 384 sliding in a bearing 385 formed in the table 53.

The lower end of each rod 384 (see also Fig. 21) is pivotally connected, (in a manner similar to the connection of the block 351 and shaft 348) by a block 386 having sliding movement within the slotted end 387 of an arm 388 pivoting on a horizontal stub shaft 389 held in the bracket 355. Each arm 388 carries a cam roller 391 which engages within an upper cam groove 392 of the double cam 358 with which it is associated.

Each gate 371 (Figs. 6 and 21) it will be recalled, consists of two plates bolted together and one plate of each pair is slotted at 393 to provide the opening or chamber in which the gate saw operates. This chamber 393 is centrally disposed in the inner end of each gate and is bounded by a circular peripheral wall. The gate saw which operates in the opening comprises a saw cutter 394, segmental in form, which passes through the chamber 393 at periodic intervals, being carried on the forward end of a stub shaft 395. This cutter is provided with a wavy radial cutting edge and peripheral saw teeth and is used to cut through and finally sever all connection between the fish mass in the magazine tunnel and the measured charge in the measuring chamber.

The cutter 394 moves within a cutter chamber 398 enclosed within a housing 399 and the shaft 395 (see also Figs. 20 and 24) is journaled in a bearing 400 formed in this housing. The chamber 398 is closed along one side by a cover plate 401 bolted to the housing.

The housing 399 with its cutter and shaft carried thereby is bolted in fixed position to the frame 331 when the machine is operating, but this unit is adapted to be lifted to expose the upper edges of the gates 371 and to gain access to the cutter. This is desirable for the purpose of sharpening the cutter and for inspection of the chamber 398 and the gates 371. The housing 399 is projected on one side in an arm 402 which loosely encircles a horizontal shaft 403, this shaft forming a pivot for the entire unit when lifted.

The shaft 403 is rotatably mounted in brackets 404 and 405 (Figs. 15, 20, 21 and 23) formed respectively in the frame 331 and the tunnel section 224. The shaft 395 is continually rotated by a chain drive, the shaft carrying a sprocket 396 over which operates a chain 397 passing over a sprocket 406 secured to one end of the shaft 403. The shaft 403 also carries a bevel gear 409 which meshes with a similar gear 411 secured to the upper end of the vertical shaft 363. This shaft extends upwardly through the table 53 and through a tubular bearing 412 resting thereon.

The segmental cutter 394 subtends an arc of substantially 90 degrees and its rotation, which moves it into, through and out of the chamber 393, gives ample time for charging the measuring chamber 330 with the fish sections while the cutter is passing through the chamber 398 and above the gates 371.

The passage of the cutter 394 through the chamber 393 takes place when the jaws 332 are in the position illustrated in Fig. 18. The wavy radial cutting edge at such time performs a trimming operation while the peripheral saw teeth remove any trimmings of fish that collect adjacent the inner circular walls of the chamber. The trimmed and fully compressed charge of fish, now designated by the numeral 415 (Fig. 18) is ready for removal from the measuring chamber from whence it is passed downwardly into a transfer chamber.

Transfer chamber and feeds thereto

A sliding plate 416 (Figs. 15, 21 and 23) constitutes the floor of the measuring chamber and this is now withdrawn from holding position. This floor plate moves beneath the slides 335 and 373 located on one side of the machine, there being provided a tongue and groove connection 417 to insure proper alignment of the parts. The plate 416 rests upon the frame 331 of the measuring chamber and its inner end when in its inner position projects over a box-like frame 418 enclosing a transfer chamber 419.

Plate 416 is pivotally connected at 421 to a link 422 pivoted at 423 to the upper end of an arm 424 keyed to the shaft 313. Oscillation of the shaft 313 slides the plate 416 into and out of chamber closing position, this movement being in synchronism with the operation of the advancing fork device also connected to and controlled by the shaft 313 as previously described.

When the plate 416 is in its open position, as illustrated in Fig. 25, the measuring chamber 330 has free communication with the transfer chamber 419 directly beneath it. The fish charge 415 is forcibly removed from the measuring chamber by the lowering of a charge plunger 425 (Figs. 23, 24, 25) located in a chamber 426 formed in a tubular extension 427 connecting with the frame 331.

The plunger 425 is carried on the lower end of a vertical rod 428 sliding within the extension 427 and carrying a block 429 having slots 430 formed in its side walls. Pivotal blocks 431 slide in the slots 430 and connect at 432 with the free end of an arm 433 (see also Fig. 32). The arm 433 is secured to a rockshaft 434 journaled in a bearing 435 formed in a cover plate 436 secured to the gear casing 167. Shaft 434 also carries an arm 437 on which is pivotally mounted at 438 a cam roller 439 operating in a cam groove 441 formed in the cam 171.

During the filling of the measuring chamber 330 with fish the plunger 425 rests in its chamber 426, its lower face providing in part the upper wall of the chamber. The fish charge 415, after being compressed and formed in the measuring chamber and lowered by the plunger 425 through the opening in the bottom of the measuring chamber formed by withdrawal of the slide 416, rests in an upright position within the transfer chamber 419.

The fish charge 415 in the transfer chamber rests in front of a transfer shift plunger 445 (Figs. 21, 23, 24 and 25) which operates laterally of the transfer chamber 419 moving toward the left, as illustrated in Figs. 24 and 25. This movement of the plunger projects the charge onto continuously moving elements of the apparatus and in axial alignment with an empty can also carried by continuously rotating parts. Movement of the plunger 445 for this transfer operation will be described later, the description now going back to the feeding of an empty can into the apparatus.

Empty can feeding device

Open-top empty containers 475 are conveyed into the machine simultaneously with the feeding of the fish and the preparing of it to produce the charge 415 for the transfer chamber, these containers (Figs. 1, 2 and 6) being positioned on the upper run of an endless conveyor chain 476 operating over an idler sprocket 477 secured to a shaft 478 journaled in a bearing 479 formed in the bracket 55. The chain 476 at its forward end passes over a sprocket 481 (Figs. 23, 27 and 38) secured to a stub shaft 482 journaled in a bearing 483 projected from the housing 51. The chain 476 is continually moved by rotation of the shaft 482 which carries a bevel pinion 484 meshing with a bevel gear 485 secured to one end of a horizontal shaft 486 journaled in a bracket 487 (see also Fig. 2) bolted to the face of the housing 51.

The shaft 486 carries a spiral gear 488 which meshes with a corresponding gear 489 secured to a vertical shaft 491 journaled at its upper end in bearings 492 formed in the table 53 and in a bearing 493 carried by a bracket 494 secured to the base 52. The shaft 491 (Figs. 36 and 38) receives rotation from the forward vertical shaft 359, the shaft 491 carrying a gear 495 which meshes with a pinion 496 keyed to the shaft 359.

The upper run of the conveyor chain 476 moves within a slot 501 (Figs. 1, 2, 6, 23 and 34) cut in the upper face of an elongated plate 502 mounted on the upper end of the bracket 55 and in a shelf 503 formed in the housing 51. This surface over which the conveyor chain passes extends throughout the entire length of the apparatus, one end forming the entrance end for the empty cans and the opposite end providing the exit end for the filled cans. The cans 475 rest upon the surfaces of the plate 502 or the shelf 503 while moving with the conveyor. Guide bars 504 carried on uprights 505 secured to the plate 502 and the shelf 503 properly guide the cans 475 into the machine.

Salt feed to empty can

The cans, after passing onto the shelf 503, are conveyed beneath a salting device and a charge of salt is deposited into each can. This device comprises a hopper 511 (Figs. 1, 2, 34 and 37) mounted on a bracket 512 bolted to the housing 51. Salt 513 is deposited into an open flared end 514 of the hopper 511. A vertical shaft 515 extends at its upper end within the hopper and rotates in a bearing 510 projected from the inner wall of the hopper and in a bearing 516 formed as an integral part of the bracket 512 its lower end extending within the housing 51 being journaled in a bearing 517 formed in the shelf 503 and in a bearing 518 carried by a bracket 519 mounted upon and supported by the base 52. The shaft 515 carries a laterally extending rod 521 which moves within the salt 513 in the hopper and constantly stirs it to prevent packing.

The lower end of the hopper 511 is closed by a circular plate 522 (Figs. 6, 33 and 34) provided with a downwardly projecting spout 523 located above the line of travel of the cans 475 on the conveyor chain 476. The plate 522 is provided with a peripheral flange 524 on the interior of which rotates a disc 525 keyed to the shaft 515, the disc being provided with a series of circular concave pockets 526 formed in its periphery, these spaces providing separated chambers 527 in which some of the salt 513 in the hopper rests. Each chamber 527, as it approaches the side of the hopper on which the spout 523 is located, passes beneath a plate 528 which isolates a measured charge of the salt within the pocket from the main body of salt. Further rotation of the isolated pocket of salt moves it over an opening 529 formed in the plate 522 and communicating with the spout 523.

The salt resting in this pocket 529 is positively dislodged by a scraper device and allowed to fall by gravity through the spout 523 into a can 475 beneath. This discharge takes place when an empty can is in proper position to receive it. This scraper device comprises a sliding rod 531 projecting through an opening 532 formed in the side wall of the hopper 511 and retained within a sleeve 533 bolted to the side wall of the hopper adjacent the opening 532. To keep the rod 531 from turning, it is provided with a pin 534 which projects into, and has movement along, a longitudinal slot 535 cut in the sleeve 533, a spring 536 being located within the sleeve and surrounding the rod 531 pressing it against the pin 534 and urging the rod inwardly into the pocket 527.

The forward end of the rod 531 is formed into a scraper blade 537, which is held by the spring 536 against the circular wall of the pocket 526 and as the disc 525 moves, the scraper blade follows the wall dislodging the salt and cleaning out the pocket. Each pocket 526 being completely filled with salt, there is thus assured a measured charge for each can, rotation of the shaft 515 being in synchronism with the movement of the passing can upon its conveyor chain 476.

The shaft 515 is intermittently moved in the same direction by a pawl and ratchet device disclosed in Figs. 9, 34, 35, 36, 37 and 38. The lower end of the shaft carries a ratchet wheel 541 which is keyed thereto beneath the bearing 518. A ratchet pawl or dog 542 is slidably mounted within a boss 543 formed in an arm 544 loosely mounted on the shaft 515 and held against the lower end of the ratchet wheel 541 by a collar 545 pinned to the shaft. A spring 546 is carried in the boss 543 and operates against the dog 542 holding it in engagement with one of the teeth of the ratchet wheel.

The arm 544 is oscillated back and forth on the shaft, being pivotally connected at 547 to an adjustable connecting rod 548, connecting at its opposite end (Fig. 38) to a cam yoke 549 sliding laterally on the forward shaft 359 and resting upon the gear 365. The cam yoke 549 carries a cam roller 551 which operates within a cam groove 552 formed in the upper face of the gear 365. By means of this connection oscillation of the arm 544 (with the resulting engagement of the dog 542 and the ratchet wheel 541 when moved in one direction) moves the shaft 515 through a few degrees of rotation, being sufficient to bring a full pocket of salt over the spout 523. Upon the return oscillation of the arm 544, the dog 542 under the yielding action of its spring 546, moves back over the engaged tooth and into engagement with the next adjacent tooth on the ratchet wheel.

*Timing device*

As the cans 475 reach the end of the upper run of the conveyor chain 476 they are brought into a timing device which picks off the foremost can from the line of cans and moves it into the can carrying turret in proper time with other operating parts of the machine. This transfer is effected by a starwheel 555 (Figs. 1, 27 and 38) keyed to the upper end of the forward shaft 359 and rotating within the bearing 362.

The starwheel 555 is provided with spaced fingers 557 and is shaped, with a part between each finger concentric to its shaft 359, to hold against the foremost can 475 of the line of cans on the conveyor 476 and prevent its advancement for a short period of time while the starwheel continues to turn after which the foremost can is picked up by the following finger 557. Since the can conveyor is completely filled with a line of cans touching each other and extending as far back as the salting mechanism, this pause in can travel permits the salt filling operation, as previously described, to take place while a positioned can is at rest under the salt filling spout.

Following this brief pause, a finger 557 engages the foremost can sweeping it laterally from the conveyor chain and on to a circular platform 558 mounted upon the housing 51. The upper surface of this platform is a continuation of the upper surface of the shelf 503. The can is held, to a circular path by engagement with a circular side wall 559 projecting upwardly from the platform 558. The shape of the starwheel 555 insures the proper spacing of adjacent cans on the platform.

Rotation of the starwheel 555 is effected through rotation of the sleeve 556 (Fig. 38) which for this purpose carries at its lower end a spur gear 561 which meshes with a similar gear 562, keyed to the vertical drive shaft 491.

*Can carrier turret*

The can carrier turret and parts carried thereby comprise a tubular turret frame 565 (Figs. 24, 26, 27 and 31) which rotates bodily around the column 168, this frame having a lower bearing section 566 and an upper bearing section 567, the former surrounding the lower end of the column 168, the upper surrounding a spacer bushing 568 mounted on the column. A dust collar 564 is positioned on the column and rests against the upper ends of the frame 565 and the bushing 568.

The lower end of the frame 565 adjacent its bearing section is projected downwardly in a circular flange 569 provided with gear teeth 571 (Fig. 27) which mesh with a pinion 572 secured to the rear vertical shaft 363. The gear 571 and pinion 572 and the lower end of the tubular frame 565 are enclosed and move within a cylindrical casing 573 bolted at 574 on the table 53. Continual rotation of the shaft 363 through the geared connection just described effects a rotation of the tubular frame 565, and all parts carried thereby, around the column 168.

The flange 569 is provided with a plurality of vertically disposed, equally spaced openings 575 (Figs. 27 and 31) there being six of these openings shown in the drawings. A sleeve 576 is positioned in each opening 575 and projects downwardly below the flange 569, a can lift plunger 577 being slidably mounted within a counterbore 578 cut therein in axial alignment with the opening 575.

Each plunger has a stem 579 extending downwardly which carries a horizontally disposed pin 581 held therein by a setscrew 582. The pin carries a cam roller 583 engaging within a cam groove 584 formed in a ring cam 585 which surrounds the lower end of the column 168 and is bolted to the table section 169. As the tubular frame 565 is rotated about the column 163 the roller 583 of each can plunger 577 traverses the cam groove 584 and is raised and lowered thereby.

As each can lift plunger 577 moves adjacent the starwheel 555, the plunger at such time being in its lowered position with its upper surface flush with the disc 569, the starwheel positions a can 475 thereon and into one of a plurality of can pockets 586 (Fig. 31) formed in a pair of spaced circular flanges 587, projected from the side wall of the tubular frame 565. To prevent any bulging of the bottom end of the can during the subsequent filling operation, the plunger 577 is preferably of a size and shape to fully engage the bottom panel of the bottom of the can, as shown in Figs. 29 and 30.

*Filling chamber and compressing units*

A filling chamber 590 is located in the carrier member 565 directly above each of the can pockets 586, the chambers being outside of a vertically disposed cylindrical wall 591 (Figs. 24 and 26) formed in the tubular frame 565. A fixed segment block 592 is bolted to the wall 591 at each spaced position, the outer surface of this stationary block moving with the carrier inside of the upper vertical wall of the cylindrical casing 573.

A movable segment block 593 is positioned adjacent each block 592 and is of a width and shape to permit free movement between the movable wall 591 and the wall of the stationary casing 573. This movable block is carried by the carrier member 565 and therefore moves along the wall 575 and at times has independent movement relative to the block 592. Such independent movement of the block 593 is utilized to change the size of the filling chamber 590 from an enlarged open condition to a relatively small closed condition. Adjacent faces of the blocks 592 and 593 are curved, as illustrated in Fig. 26, to provide circular walls 594 and 595 which engage and further compress the charge of fish 415 when the chamber is closed, as will be more fully explained.

Each filling chamber 590 moves in the same horizontal plane in which the transfer chamber 419 is located. A horizontal plate 596 (Figs. 24 and 27) is secured to the table 53 and constitutes the floor of the transfer chamber 419 as well as the floor of the filling chambers 590 when in filling position. The plate 596 is extended forwardly into close proximity to the rotating circular wall 591 of the tubular frame 565 and projects forwardly as an arcuate extension 597 and beyond the end of the transfer chamber 419.

As a filling chamber 590 passes the open end of the transfer chamber 419, the plunger 445 is operated to move the charge into the measuring chamber, the movable block 593 at such time being in open position and separated from the block 592 to provide free entrance into the filling chamber.

Plunger 445 (Figs. 24 and 25) is pivoted at 601 to a link 602, connected at 603 to the upper end of a lever 604 (see also Fig. 31) pivoted on a horizontal stud 605, carried in a bracket 606 secured beneath the table 53. The upper end of the lever 604 moves back and forth within a slot 607 cut in the table 53 and in a corresponding slot 608 cut through the plate 596. The lower end of the lever 604 is pivoted at 609 to an adjustable connecting member 611 pivoted at 612 to a sliding rod 613 moving within a bearing block 614 secured beneath the table section 169.

The opposite end of the rod 613 is formed into a cam yoke 615 (see also Fig. 19) the forked end of which straddles a collar 616 carried by the vertical shaft 164. The yoke 615 carries a pin 617 on which is mounted a cam roller 618, operating within a groove 619 of a horizontal face cam 621 secured to the shaft 164 beneath the collar 616.

Forward movement of the transfer shift plunger 445 by the actuating devices just described projects the fish charge 415 into the filling chamber 590 (as illustrated in Figs. 24 and 26). The distance between the fixed and movable blocks 592 and 593 at such time is sufficient to permit the insertion of the fish charge without any interruption of the continuously moving filling chambers. The charge 415 during and immediately following its insertion into the filling chamber 590 slides over the upper surface of the presented portion 597 of the plate 596, being moved along by the fixed block 592. The movable block 593, immediately following the inserting operation, approaches the fixed block 592 thus further compressing the fish charge.

Actuation of the blocks 593 will now be considered. Each block 593 is provided with a laterally extending slot 625 (Fig. 26), in which operates a slide block 626, pivoted at 627 to the forward end of an arm 628 of a bellcrank lever 629, pivoted on the upper end of a stud 631 (see also Fig. 24) bolted to a boss 632 projected inwardly from the wall 591. A second arm 633 of the bellcrank lever 629 carries a pin 634 on which is mounted a cam roller 635 operating within a cam groove 636 formed in the under surface of a face cam 637 keyed on the column 168 and held in vertical position by the bushing 568.

*Can filling plunger device*

Filling plunger devices are carried by the moving can carrier, there being a separate unit or device for each of the filling chambers. The tubular frame 565 is formed with radial extensions 641 (Figs. 2, 24 and 28) adjacent its upper bearing 567 and a plunger sleeve 642 and a spacer member 643 are secured to each extension 641 by bolts 644. A can filling plunger 645 is located within each sleeve 642 and is above and in axial alignment with the can 475 resting on and associated with its plunger 577. The lower surface of the filling plunger during the introduction of fish into the filling chamber constitutes a ceiling of the chamber, as illustrated in Fig. 24.

The plunger is adapted to be depressed to discharge the finally shaped and compressed charge of fish from the filling chamber into the aligned can 475, this being after the filling unit has moved beyond the supporting floor of the extension 597. This plunger movement is effected by a cam located above the upper end of the plungers 645. Each plunger is extended at 646 to provide support for a pin 648 carrying a cam roller 649 and a guide roller 651.

The sleeve 642 extends upwardly into spaced projections 652 providing a vertical slot 653 in which the guide roller 651 mounted on its pin 648, travels as the plunger 645 is raised and lowered, this construction preventing shifting of the plunger on its own axis while holding the cam roller 649 in proper position to traverse a cam groove 650, formed in an outer cam ring 654 carried by an inner cam ring 655 bolted to the gear casing 107. The cam rings 654 and 655 are thus held stationary and as the tubular frame 565 with the can filling units rotates, each plunger 645 forces the charge of fish from its filling chamber into the open top can 475 therebeneath.

Previous to this can filling movement a venting blade 664 (Figs. 24, 26, 29 and 30) associated with each plunger moves into the can along one side of its vertical wall, the blade sliding within a vertical slot 665 formed in the wall 591. This blade 664 is provided with a vertically extending groove 666 which lies adjacent the can wall and extends to a point above the bearing of the filling plunger 645 in its sleeve 642 thereby establishing communication with the atmosphere. The lower end of this blade is preferably tapered as at 667 to more easily guide it into a can.

The movement of the blade 664 (Fig. 24) is cam controlled, the upper end thereof being secured to a vertical slide member 668 having a lateral tongue and groove connection 669 (see also Fig. 28) in the spacer block 643. This insures proper vertical alignment, the upper end of the slide carrying a pin 671 on which a cam roller 672 is mounted, the roller traversing a cam track 673 formed in the inner stationary cam ring 655. The can 475 is lifted into the position illustrated in Figs. 29 and 30 just prior to the downward movement of the filling plunger 645, the can being lifted with its plunger 577 by the cam 585 as previously described.

The actual filling of the fish charge into the can takes place at a relatively slow rate of speed, the filling operations being performed as the can and its filling apparatus rotate in its circular path of travel with the can turret. After the charge has been fully inserted in the can it is slightly compressed vertically by the plunger and the venting blade 664 is lifted and fully withdrawn, as illustrated in Fig. 30.

*Filled can discharge*

As the can filling unit with its filled can approaches the discharge position, the filling plunger 645 is lifted to its raised position and the can with its contents is lowered by its plunger 577. The can still resting within its turret pocket 586 is then engaged by a finger of a starwheel 675 (Figs. 27 and 38) mounted on the upper end of a vertical shaft 676 journaled for rotation within a bearing 677 projecting upwardly from the table 53. The lower end of the shaft 676 carries a gear 678 (see also Fig. 19) which meshes with the gear 562 secured to the vertical shaft 491 and this provides the driving connection for the rotation of the starwheel 675.

The starwheel 675 (Figs. 1 and 27) sweeps the filled can from its pocket 586 and moves it along a circular passageway and onto a floor member 683 which is an extension of the member 558. A circular wall 684 guides the can in this path and onto a discharge conveyor chain 685 having its upper run moving within a slot 686 cut in the floor member 683. Spaced guide bars 687 mounted on the floor member 683 extend from the circular wall 684 and guide the can out of the machine.

It will now be evident from the preceding description that the invention effects substantial improvement in the feeding of the fish, in the cutting of it into proper can lengths, in the accurate measuring of it for proper weight and quantity and finally in the filling of it into cans.

Fish as received for canning, sometimes varies in size and it is essential, in a successful fish canning machine, that there be a uniform output in the cans, irrespective of the size of the fish entering the machine. The apparatus of the present invention, as is apparent from the foregoing description, provides for this variation in fish size by filling the measuring chamber 330 with a uniform quantity of fish, compressed to a predetermined degree of compactness made possible by the adjustable yielding spring action of the advancing fork members 271 and 275. A uniform quantity of fish, also under predetermined compactness, is maintained within the tunnel magazine by reason of the spring-held friction clutch parts 112 and 119, as previously described, and this feature also assists in maintaining uniformity.

The yielding nature of this fork feed, as controlled by the friction clutch, is susceptible of delicate adjustment to provide against even slight changes or non-uniformity in the crowding of the fish sections in the magazine but this delicate feature cooperates instead of interferes with the positive, relatively strong driving actuation of the fish feed carrier and the fish cutting devices as effected through the dog clutch mechanism.

The improved type of fish carrier into which the fish may be received in interlocked relation, as clearly set forth in the description, insures a more uniform diameter of the string of fish as it passes to the cutting device. A further advantage results in the manner of disposing of the less attractive tail end pieces of the fish by incorporating them with the larger fish pieces, thus presenting a more uniform and more satisfying appearance of the fish mass in the can. With this improved method of filling, the upper surface of the fish presents an attractive appearance showing a clean cut surface devoid of unsightly skins, bones, etc.

The entire operations of the present apparatus being automatic, except for the manual placing of the fish into the carrier, it will be apparent that improved sanitation results and as to the manual operation required, this is greatly simplified and less highly skilled operators may be employed.

The change gear transmission of the present apparatus permits operation of the carrier at a speed which insures the least slipping of the friction clutch in its action of maintaining a uniform supply of fish in the tunnel magazine. The provision of a single measuring chamber, together with the feeding of the separated fish charge into a plurality of units associated with the cans being filled, reduces necessary adjustments to a minimum. The multiple filling elements provide ideal, slow, even filling which insures a more attractive appearance in the filled can.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a fish canning machine, the combination of a carrier for receiving and advancing the fish into the machine, a cutter movable and operating transversely of the line of travel of said carrier for cutting said fish into predetermined lengths, means for moving said lengths of fish into vertical position resting on their cut ends, a measuring chamber, and means for transferring said cut fish into said measuring chamber.

2. In a fish canning machine, the combination of a carrier comprising an endless conveyor chain and a series of buckets mounted thereon said buckets when in carrying position being located adjacent one another and presenting an uninterrupted longitudinally extending receptacle for receiving and advancing the fish into the machine, a cutter operating transversely of the line of travel of said carrier and passing between adjacent buckets for cutting said fish into predetermined lengths, each length being substantially the length of one bucket, a measuring chamber, and means for transferring said cut fish into said measuring chamber.

3. In a fish canning machine, the combination of a carrier for receiving and advancing the fish into the machine, means for intermittently moving said carrier, a cutter movable and operating transversely of the line of travel of said carrier when it is at rest for cutting said fish into predetermined lengths, means for moving said lengths of fish into vertical position resting on their cut ends, a measuring chamber, and means for transferring said cut fish into said measuring chamber.

4. In a fish canning machine, the combination of a carrier for receiving and advancing the fish into the machine, means for intermittently moving said carrier, a cutter operating transversely of the line of travel of said carrier when it is at rest for cutting said fish into predetermined lengths, a locking device for centering and holding said carrier in rest position, a measuring chamber, and means for transferring said cut fish into said measuring chamber.

5. In a fish canning machine, the combination of a carrier comprising an endless conveyor chain and a series of buckets mounted thereon for receiving and advancing the fish into the machine each bucket having a slotted side wall, a cutter operating transversely of the line of travel of said carrier and passing between adjacent buckets for cutting the fish into lengths substantially equal to the length of one of said buckets, a feeding tunnel, and instrumentalities moving through the slots in the side wall of a said bucket for transferring the cut fish from said carrier into said tunnel.

6. In a fish canning machine, the combination of a carrier comprising an endless conveyor chain and a series of buckets mounted thereon for receiving and advancing the fish into the machine each bucket having a slotted side wall, means for intermittently moving said carrier, a cutter operating transversely of the line of travel of said carrier and passing between adjacent buckets when said carrier is at rest for cutting the fish into lengths substantially equal to the length of one of said buckets, a feeding tunnel, and instrumentalities moving through the slots in the side wall of a said bucket when said carrier is at rest for transferring the cut fish from said carrier into said tunnel.

7. In a fish canning machine, the combination of a carrier comprising an endless conveyor chain and a series of buckets mounted thereon for receiving and advancing the fish into the machine each bucket having a slotted side wall, a cutter adjacent said carrier and operating to cut the fish into predetermined lengths while in said carrier, a feeding tunnel, instrumentalities moving through the slots in the side wall of a said bucket and transferring the cut fish from said carrier into said tunnel, actuating means for operating said instrumentalities in synchronism with the cutting operation, and a slip clutch interposed between the said instrumentalities and their actuating means.

8. In a fish canning machine, the combination of a carrier for receiving the fish in a horizontal position and advancing it into the machine, a cutter movable transversely to the fish and to the line of travel of said carrier for severing said fish into predetermined lengths, a feeding tunnel located adjacent the discharge end of said carrier, and instrumentalities for removing each length of cut fish from said carrier and placing it into said tunnel while turning it into vertical position.

9. In a fish canning machine, the combination of a carrier for receiving the fish in a horizontal position and advancing it into the machine, a cutter movable across the line of travel of the carrier for severing said fish into predetermined lengths, a measuring chamber, a feeding tunnel interposed between one end of said carrier and said measuring chamber, and instrumentalities for removing each length of cut fish from said carrier and turning it into vertical position within said tunnel, and means for advancing said positioned fish along said tunnel and into said measuring box.

10. In a fish canning machine, the combination of a carrier comprising an endless conveyor chain and a series of buckets mounted thereon for receiving and advancing the fish into the machine each bucket having a slotted side wall, means including a continuously rotating shaft for actuating said carrier, a feeding tunnel, instrumentalities moving through the slots in the side wall of said buckets for transferring the fish from said buckets and into said tunnel, means including said continuously rotating shaft for actuating said instrumentalities, and a safety clutch mechanism operating in the event of any interference with the transferring operation of said instrumentalities to disconnect said instrumentalities and said carrier from said actuating shaft.

11. In a fish canning machine, the combination of a feeding tunnel having a restricted discharge opening, a carrier for advancing cut fish to a position adjacent the entrance end of said tunnel, instrumentalities for transferring the cut fish from said carrier into said tunnel, a measuring chamber located adjacent and beyond the restricted end of said tunnel, and an advancing fork device operating in said tunnel for compressing said fish and forcing it through the restricted opening of said tunnel into said measuring chamber, and a gate arranged to close the measuring chamber and separate it from said tunnel.

12. In a fish canning machine, the combination of a feeding tunnel having a restricted discharge opening, a carrier for advancing cut fish toward said tunnel, and means whereby slices of fish are laid flat against each other and transversely of said tunnel, a measuring chamber of variable capacity located adjacent the restricted end of said tunnel, means for varying the capacity of said chamber, and an advancing fork device operating in said tunnel for forcing the fish through the restricted opening thereof and into said measuring chamber when the latter is at its largest capacity.

13. In a fish canning machine, the combination of a feeding tunnel for containing a supply of fish and having a restricted opening in its discharge end, means for feeding fish into said tunnel and devices whereby slices of fish are laid flat against each other transversely of said tunnel, a measuring chamber located adjacent said restricted opening, an advancing fork device operating in said tunnel for compressing said fish against the restricted wall of its discharge end while moving it through said opening and into said measuring chamber, and means for closing the passage between said tunnel and said measuring chamber whereby a charge of fish in said chamber is segregated from the supply of fish in said tunnel, and means for moving inward a wall of said chamber.

14. In a fish canning machine, the combination of a feeding tunnel for containing a supply of fish and having a restricted opening in its discharge end, a measuring chamber located adjacent said restricted opening, an advancing fork device operating in said tunnel for compressing said fish against the restricted wall of its discharge end while moving it through said opening and into said measuring chamber, means for arranging a succession of pieces of cut fish on their cut ends to be advanced by said fork device, means for further compressing said charge of fish in said chamber and imparting a definite shape thereto, and means for closing the passage between said tunnel and said measuring chamber whereby a charge of fish in said chamber is segregated from the supply of fish in said tunnel.

15. In a fish canning machine, the combination of a feeding tunnel for containing a supply of fish and having a discharge opening in one end, a measuring chamber located adjacent said end and communicating with said discharge opening, an advancing fork device operating in said tunnel for moving said fish through said discharge opening and into said chamber, a slide gate device for moving across the passage between said tunnel and said chamber and segregating a charge of fish in said chamber from the supply of fish in said tunnel, and a circular gate saw operating in said gate device for cutting any remaining connection between said fish charge and said fish supply.

16. A fish canning machine comprising, in combination a measuring chamber for holding a quantity of fish sufficient to fill a can, means operating in said chamber for compressing the measured quantity of fish and shaping it into a compact charge, a transfer chamber located beneath said measuring chamber, means for transferring said fish charge into said transfer chamber, a rotating can carrier turret having a plurality of filling chambers, means for continuously moving each filling chamber consecutively adjacent said transfer chamber, and a transfer shift device for moving the fish charge from said transfer chamber into one of said filling chambers as it passes.

17. A fish canning machine comprising, in combination a measuring chamber for holding a quantity of fish sufficient to fill a can, means operating in said chamber for compressing the measured quantity of fish and shaping it into a compact charge, a transfer chamber located adjacent said measuring chamber, means for transferring said fish charge into said transfer chamber, a rotating can carrier turret having a plurality of filling chambers and adapted to carry a plurality of cans, means for continuously moving each filling chamber consecutively adjacent said transfer chamber, a transfer shift device for moving the fish charge from said transfer chamber into one of said filling chambers as it passes adjacent, and means carried by said turret for forcing the fish charge into one of said cans.

18. In a fish canning machine, the combination of a fish measuring chamber and a fish transfer chamber both held in stationary position adjacent one another, a plurality of filling chambers carried by a continuously rotating turret and passing consecutively adjacent said transfer chamber, and reciprocating means operating intermittently in said measuring chamber and in said transfer chamber for feeding fish from the measuring chamber into the transfer chamber and thence from the transfer chamber into a said filling chamber without any interruption in the rotative travel of the said filling chambers.

19. In a fish canning machine, the combination of a fish measuring chamber and a fish transfer chamber both held in stationary position adjacent one another, a continuously rotating turret having a plurality of filling chambers for carrying a plurality of aligned cans, reciprocating means operating intermittently in said measuring and in said transfer chambers for feeding fish from the measuring chamber into the transfer chamber and thence from the transfer chamber into a said filling chamber, and means carried by said turret for moving fish from a filling chamber into its aligned can, all of said fish movements taking place in proper synchronism and without interruption of rotation of said turret and parts carried thereby.

20. In a fish canning machine, the combination of a stationary chamber for receiving a formed charge of fish, means for feeding fish and means whereby slices of fish are laid flat against each other and transversely to their direction of feeding, a rotatable turret moving adjacent said chamber, a plurality of spaced contractible filling chambers mounted on said turret and moving therewith successively past said stationary chamber, means for transferring said formed charge of fish from said stationary chamber into a said filling chamber as it is moved adjacent thereto, and means for moving inward side walls of said filling chambers and contracting said filling chambers in synchronism with the transferring operation.

21. In a fish canning machine, the combination of a conveyer for discharging slices of fish downward in an edgewise direction, rotary devices for moving said slices flat-wise in a horizontal direction and arranging them against one another, a stationary chamber for receiving a formed charge of fish, a rotatable turret moving adjacent said chamber, a plurality of spaced contractible filling chambers mounted on said turret and moving therewith successively past said stationary chamber, means for transferring said formed charge of fish from said stationary chamber into a said filling chamber as it is moved adjacent thereto, such said filling chamber having a pair of cooperating jaws, said jaws separating to provide maximum expansion during the transferring operation and moving together to compress the fish charge after it has been fully received in its filling chamber.

22. In a fish canning machine, the combination of a conveyer for discharging slices of fish downward in an edgewise direction, rotary devices for moving said slices flat-wise in a horizontal direction and arranging them against one another, a stationary chamber for receiving a formed charge of fish, a rotatable turret moving adjacent said chamber for conveying cans in a circular path of travel, a plurality of spaced filling chambers of variable capacity mounted on said turret and moving therewith successively past said stationary chamber, with a said can in alignment with each filling chamber, means for transferring said formed charge of fish from said stationary chamber into a said filling chamber as it is moved adjacent thereto, means for moving inward side walls of said filling chambers and contracting said filling chambers in synchronism with the transferring operation whereby its expansion is at a maximum throughout said transfer, and means for inserting said fish charge into its aligned can during the continued rotation of said turret and while said filling chamber is substantially completely contracted.

23. In a fish canning machine, for cutting and packing fish into cans, the combination of a carrier comprising an endless conveyor chain and a series of buckets mounted thereon the width of each bucket being determined by the height of the cans into which the fish is subsequently packed, said buckets when in carrying position being located in closely adjacent relation and presenting an uninterrupted longitudinally extending receptacle for receiving and advancing the fish into the machine, and a cutter operating transversely of the line of travel of said carrier and passing between adjacent buckets for cutting said fish into can lengths.

24. In a fish canning machine for cutting and packing fish into cans, the combination of a fish carrier and a can carrier, the fish carrier comprising an endless conveyor chain and a series of buckets mounted thereon said buckets in carrying position being located in closely adjacent relation and presenting an uninterrupted longitudinally extending receptacle for receiving and advancing the fish into the machine, a cutter operating transversely of the line of travel of said carrier for cutting said fish into predetermined lengths, and means for transferring said cut lengths into cans carried by said can carrier.

25. In a fish canning machine, the combination of a feeding tunnel having a restricted discharge end, a carrier for advancing cut fish to a position adjacent the entrance end of said tunnel, instrumentalities for transferring the cut fish from said carrier into said tunnel, a measuring chamber located adjacent the restricted end of said tunnel, an advancing fork device operating in said tunnel for compressing said fish and forcing it through the restricted end of said tunnel into said measuring chamber, and adjusting means for varying the compression exerted by said fork device.

26. In a fish canning machine, the combination of a feeding tunnel for fish storage, a carrier for advancing fish to a position adjacent the entrance end of said tunnel, instrumentalities including rotating fork members for transferring the fish from said carrier into said storage tunnel, and means for exerting a predetermined compression force on the transferred fish as it is positioned in the tunnel by said fork members.

27. In a fish canning machine, the combination of a feeding tunnel for fish storage, a carrier for advancing fish to a position adjacent the entrance end of said tunnel, instrumentalities including rotating fork members for transferring the fish from said carrier into said storage tunnel, means for exerting a predetermined compression force on the transferred fish as it is positioned in the tunnel by said fork members, actuating devices for said carrier and said instrumentalities, and means embodying a safety clutch for disconnecting said carrier and said instrumentalities from said actuating devices when the resistance of said fish in said tunnel against said fork members exceeds said compression force.

28. In a fish canning machine, the combination of a feeding tunnel for fish storage, a carrier for advancing fish to a position adjacent the entrance end of said tunnel, instrumentalities for transferring the fish from said carrier into said storage tunnel, actuating devices, said carrier and said instrumentalities being connected with said actuating devices by a safety clutch and a dog clutch, means affected by said safety clutch for stopping the operation of said parts in the presence of slightly abnormal fish feeding conditions, and means affected by said dog clutch for normally operating said parts with a relatively strong driving force.

SAMUEL S. JACOBS.
WALTER E. ROONEY.